United States Patent
Eraker et al.

(10) Patent No.: US 10,078,866 B1
(45) Date of Patent: Sep. 18, 2018

(54) COLLABORATIVE SYSTEM FOR ONLINE SEARCH

(71) Applicant: Redfin Corporation, Seattle, WA (US)

(72) Inventors: David Eraker, Seattle, WA (US); Adam Michael Dougherty, Seattle, WA (US); Edward M. Smith, Woodinville, WA (US); Stephen Eraker, Clackamas, OR (US)

(73) Assignee: Redfin Corporation, Seattle, WA (US)

( * ) Notice: Subject to any disclaimer, the term of this patent is extended or adjusted under 35 U.S.C. 154(b) by 0 days.

(21) Appl. No.: 15/436,443

(22) Filed: Feb. 17, 2017

Related U.S. Application Data

(63) Continuation of application No. 13/754,833, filed on Jan. 30, 2013, now Pat. No. 9,576,317, which is a continuation of application No. 11/154,937, filed on Jun. 16, 2005, now Pat. No. 9,105,061.

(60) Provisional application No. 60/649,459, filed on Feb. 1, 2005, provisional application No. 60/580,046, filed on Jun. 16, 2004.

(51) Int. Cl.
  *G06Q 30/00* (2012.01)
  *G06Q 30/06* (2012.01)
  *G06Q 50/16* (2012.01)

(52) U.S. Cl.
  CPC ......... *G06Q 30/0643* (2013.01); *G06Q 30/00* (2013.01); *G06Q 30/0601* (2013.01); *G06Q 50/16* (2013.01); *G06Q 50/167* (2013.01)

(58) Field of Classification Search
  None
  See application file for complete search history.

(56) References Cited

U.S. PATENT DOCUMENTS

| | | | |
|---|---|---|---|
| 5,032,989 A | 7/1991 | Tometta | |
| 5,414,621 A | 5/1995 | Hough | |
| 5,844,570 A * | 12/1998 | Curtright | G06T 11/00 345/629 |
| 5,884,216 A * | 3/1999 | Shah | G01C 21/3446 340/995.1 |

(Continued)

OTHER PUBLICATIONS

Internet wayback machine: showing that "www.redfin.com" domain name was in use more than one year before applicant's effective filed, retrieved on Jan. 30, 2009.

(Continued)

*Primary Examiner* — Matthew T Sittner
(74) *Attorney, Agent, or Firm* — Knobbe, Martens, Olson & Bear, LLP

(57) ABSTRACT

A collaborative real estate search is described. Overlay data including indications of properties for sale within a geographic area are provided to a first user device. The overlay data are capable of being overlaid on a map of the geographic area on a user interface. Selections of some of the properties for sale are received from the first user device and a list of those properties is stored within a folder associated with the first user. The system enables a second user device—associated with a second user who is associated with the first user—to access the list of the properties selected by the user. This includes enabling the second user device to cause information regarding the properties to be stored within the folder. The information is made available for display on a user interface of the first user device.

18 Claims, 15 Drawing Sheets

(56) References Cited

U.S. PATENT DOCUMENTS

| | | | |
|---|---|---|---|
| 6,058,369 A * | 5/2000 | Rothstein | G06Q 30/02 705/38 |
| 6,307,573 B1 | 10/2001 | Barros | |
| 6,594,633 B1 * | 7/2003 | Broerman | G06Q 10/10 705/313 |
| 6,636,803 B1 * | 10/2003 | Hartz, Jr. | G06Q 10/10 701/454 |
| 6,684,196 B1 * | 1/2004 | Mini | G06Q 30/02 705/14.34 |
| 6,839,880 B1 | 1/2005 | Morse et al. | |
| 6,882,313 B1 | 4/2005 | Fan et al. | |
| 6,883,002 B2 * | 4/2005 | Faudman | G06Q 10/06311 705/26.1 |
| 7,085,650 B2 | 8/2006 | Anderson | |
| 7,171,389 B2 | 1/2007 | Harrison | |
| 7,212,670 B1 | 5/2007 | Rousselle et al. | |
| 7,283,909 B1 * | 10/2007 | Olsen | G09B 29/005 702/2 |
| 7,333,943 B1 * | 2/2008 | Charuk | G06Q 10/10 705/26.1 |
| 7,346,519 B2 * | 3/2008 | Carr | G06Q 30/06 705/26.1 |
| 7,389,242 B2 * | 6/2008 | Frost | G06Q 10/10 705/313 |
| 7,451,150 B2 * | 11/2008 | Faudman | G06Q 10/06311 |
| 7,577,582 B1 * | 8/2009 | Ojha | G06Q 30/06 705/26.3 |
| 8,195,552 B1 | 6/2012 | Merlo et al. | |
| 9,105,061 B2 | 8/2015 | Eraker et al. | |
| 9,213,461 B2 | 12/2015 | Eraker et al. | |
| 9,576,317 B2 | 2/2017 | Eraker et al. | |
| 9,760,237 B2 | 9/2017 | Eraker et al. | |
| 2001/0005829 A1 * | 6/2001 | Raveis, Jr. | G06Q 30/02 705/316 |
| 2001/0014185 A1 | 8/2001 | Chitradon et al. | |
| 2001/0037273 A1 * | 11/2001 | Greenlee, Jr. | G06Q 10/10 705/35 |
| 2001/0039506 A1 * | 11/2001 | Robbins | G06Q 10/06 705/7.34 |
| 2001/0047282 A1 * | 11/2001 | Raveis, Jr. | G06Q 10/1095 705/7.19 |
| 2002/0010572 A1 | 1/2002 | Orton et al. | |
| 2002/0035494 A1 * | 3/2002 | Eckes | G06Q 30/0273 705/313 |
| 2002/0040304 A1 * | 4/2002 | Shenoy | G06Q 30/06 705/35 |
| 2002/0046077 A1 | 4/2002 | Mozayeny et al. | |
| 2002/0046159 A1 * | 4/2002 | Raveis, Jr. | G06Q 30/02 705/38 |
| 2002/0049624 A1 * | 4/2002 | Raveis, Jr. | G06Q 10/06 705/316 |
| 2002/0065739 A1 * | 5/2002 | Florance | G06Q 30/06 705/26.43 |
| 2002/0087367 A1 | 7/2002 | Azani | |
| 2002/0087389 A1 | 7/2002 | Sklarz et al. | |
| 2002/0095346 A1 * | 7/2002 | Liss | G06Q 30/02 705/26.41 |
| 2002/0128857 A1 * | 9/2002 | Lee | G06Q 30/04 705/51 |
| 2002/0133369 A1 * | 9/2002 | Johnson | G06Q 10/10 705/321 |
| 2002/0133374 A1 * | 9/2002 | Agoni | G06Q 10/10 705/2 |
| 2002/0138485 A1 * | 9/2002 | Faudman | G06Q 10/06311 |
| 2002/0198736 A1 * | 12/2002 | Harrison | G06Q 30/02 705/51 |
| 2003/0004861 A1 * | 1/2003 | Amend | G06Q 10/10 705/37 |
| 2003/0011599 A1 * | 1/2003 | Du | G06T 17/05 345/428 |
| 2003/0040934 A1 * | 2/2003 | Skidmore | G06Q 10/10 705/4 |
| 2003/0041108 A1 * | 2/2003 | Henrick | G06F 17/30873 709/205 |
| 2003/0055713 A1 * | 3/2003 | Pinto | G06F 17/3089 705/313 |
| 2003/0064705 A1 * | 4/2003 | Desiderio | G06Q 30/06 455/412.1 |
| 2003/0101063 A1 * | 5/2003 | Sexton | G06Q 30/02 705/26.1 |
| 2003/0101074 A1 * | 5/2003 | Suzuki | G06Q 30/02 705/313 |
| 2003/0140064 A1 | 7/2003 | Klein | |
| 2003/0158786 A1 * | 8/2003 | Yaron | G06Q 30/02 705/14.41 |
| 2003/0204406 A1 * | 10/2003 | Reardon | G06Q 30/02 705/313 |
| 2003/0220805 A1 * | 11/2003 | Hoffman | G06Q 10/10 705/313 |
| 2003/0225764 A1 * | 12/2003 | Smith | G06Q 10/10 |
| 2003/0229552 A1 | 12/2003 | Lebaric et al. | |
| 2004/0008866 A1 | 1/2004 | Rhoads et al. | |
| 2004/0030616 A1 * | 2/2004 | Florance | G06Q 50/16 705/51 |
| 2004/0030631 A1 * | 2/2004 | Brown | G06Q 30/06 705/37 |
| 2004/0039629 A1 * | 2/2004 | Hoffman | G06Q 10/08 705/313 |
| 2004/0044696 A1 * | 3/2004 | Frost | G06Q 10/10 |
| 2004/0046798 A1 * | 3/2004 | Alen | G06Q 30/02 715/777 |
| 2004/0049406 A1 | 3/2004 | Muncaster et al. | |
| 2004/0054606 A1 * | 3/2004 | Broerman | G06Q 10/10 705/26.1 |
| 2004/0059586 A1 * | 3/2004 | Brimberry | G06Q 30/02 705/26.1 |
| 2004/0064334 A1 * | 4/2004 | Nye | G06F 17/30241 705/317 |
| 2004/0088172 A1 * | 5/2004 | Baglioni | G06Q 30/02 705/26.1 |
| 2004/0098284 A1 | 5/2004 | Petito et al. | |
| 2004/0110515 A1 | 6/2004 | Blumberg | |
| 2004/0119759 A1 | 6/2004 | Barros | |
| 2004/0128215 A1 | 7/2004 | Florance et al. | |
| 2004/0133493 A1 * | 7/2004 | Ford | G06Q 10/10 705/35 |
| 2004/0143450 A1 * | 7/2004 | Vidali | G06Q 40/02 705/38 |
| 2004/0167797 A1 | 8/2004 | Goncalves | |
| 2004/0167798 A1 | 8/2004 | Hastings | |
| 2004/0172418 A1 | 9/2004 | Dorum et al. | |
| 2004/0220906 A1 | 11/2004 | Gargi et al. | |
| 2004/0243299 A1 | 12/2004 | Scaer | |
| 2004/0243533 A1 | 12/2004 | Dempster et al. | |
| 2004/0249705 A1 * | 12/2004 | Spencer | G06Q 30/0247 705/14.46 |
| 2005/0004927 A1 | 1/2005 | Singer | |
| 2005/0010423 A1 * | 1/2005 | Bagbey | G06Q 30/02 705/313 |
| 2005/0049953 A1 * | 3/2005 | Vu | G06Q 30/02 705/36 R |
| 2005/0080723 A1 * | 4/2005 | Burchetta | G06Q 20/10 705/39 |
| 2005/0096926 A1 * | 5/2005 | Eaton | G06Q 10/10 705/313 |
| 2005/0125237 A1 * | 6/2005 | Harrison | G06Q 30/02 705/313 |
| 2005/0132305 A1 | 6/2005 | Guichard et al. | |
| 2005/0149561 A1 | 7/2005 | Hodnett et al. | |
| 2005/0192930 A1 * | 9/2005 | Hightower | G06Q 30/02 |
| 2005/0195219 A1 * | 9/2005 | Hirono | G06F 17/30241 345/619 |
| 2005/0203671 A1 | 9/2005 | Mertins et al. | |
| 2005/0203768 A1 * | 9/2005 | Florance | G06Q 30/0643 701/438 |
| 2005/0240448 A1 * | 10/2005 | Smith | G06Q 40/08 705/4 |
| 2005/0273346 A1 * | 12/2005 | Frost | G06Q 30/00 705/316 |

(56) References Cited

U.S. PATENT DOCUMENTS

| | | | |
|---|---|---|---|
| 2005/0273354 A1 | 12/2005 | Adams | |
| 2005/0288957 A1* | 12/2005 | Eraker | G06Q 30/00 345/630 |
| 2005/0288958 A1* | 12/2005 | Eraker | G06Q 30/00 705/316 |
| 2005/0288959 A1* | 12/2005 | Eraker | G06F 17/3087 705/1.1 |
| 2006/0174209 A1 | 8/2006 | Barros | |
| 2007/0226004 A1 | 9/2007 | Harrison | |
| 2008/0097767 A1* | 4/2008 | Milman | G06Q 30/02 705/1.1 |
| 2008/0133423 A1* | 6/2008 | Adiga | G06Q 40/04 705/80 |
| 2011/0010302 A1* | 1/2011 | Faudman | G06Q 10/06311 705/313 |
| 2013/0254072 A1* | 9/2013 | Eraker | G06Q 30/00 705/26.64 |
| 2013/0254670 A1 | 9/2013 | Eraker et al. | |

OTHER PUBLICATIONS

Pdf file of www.redfin.com website; FAQ section indicating that Redfin.com was founded in 2002, retrieved on Jan. 30, 2009.
Office Action dated Jun. 18, 2015 in U.S. Appl. No. 13/754,808.
Notice of Allowance dated Apr. 1, 2015 in U.S. Appl. No. 11/154,937.
Office Action dated Feb. 25, 2015 in U.S. Appl. No. 13/754,808.
Final Office Action for U.S. Appl. No. 13/754,808, dated Apr. 8, 2014, David Eraker, "User Interfaces for Displaying Geographic Information", 44 pages.
Final Office Action for U.S. Appl. No. 11/154,937, dated Nov. 29, 2013, David Eraker, "Online Marketplace for Real Estate Transactions", 73 pages.
Office Action for U.S. Appl. No. 13/754,808, dated Oct. 17, 2013, David Eraker, "User Interfaces for Displaying Geographic Information", 42 pages.
Office action for U.S. Appl. No. 11/154,937, dated Jul. 29, 2013, Eraker et al., "Online Marketplace for Real Estate Transactions", 54 pages.
Notice of Allowance dated Apr. 20, 2015 in U.S. Appl. No. 11/154,263.
Office Action dated Nov. 24, 2014 in U.S. Appl. No. 11/154,937.
Office action for U.S. Appl. No. 11/154,263 dated Sep. 9, 2014, Eraker et al., "Web-based Real Estate Mapping System", 31 pages.
Office Action for U.S. Appl. No. 11/154,263 dated Apr. 3, 2014, David Eraker, "Web-based Real Estate Mapping System", 39 pages.
Final Office Action for U.S. Appl. No. 11/154,263 dated Nov. 14, 2013, David Eraker, "Web-based Real Estate Mapping System", 62 pages.
Office action for U.S. Appl. No. 11/154,263 dated Jul. 8, 2013, Eraker et al., "Web-based Real Estate Mapping System", 62 pages.
Office Action for U.S. Appl. No. 13/754,808, dated Dec. 4, 2015, David Eraker, "User Interfaces or Displaying Geographic Information," 53 pages.

* cited by examiner

FIG.12

COLLABORATIVE SYSTEM FOR ONLINE SEARCH

CROSS-REFERENCE TO RELATED APPLICATIONS

This application is a continuation of U.S. patent application Ser. No. 13/754,833, filed on Jan. 30, 2013, which is a continuation of U.S. patent application Ser. No. 11/154,937, filed on Jun. 16, 2005, now U.S. Pat. No. 9,105,061, which claims the benefit of U.S. Provisional Patent Application No. 60/580,046, filed Jun. 16, 2004, and U.S. Provisional Patent Application No. 60/649,459, filed Feb. 1, 2005; each of the foregoing are hereby incorporated herein by reference in their entirety.

BACKGROUND

The real estate market is characterized by numerous inefficiencies that create problems for consumers, agents, and vendors.

Consumers suffer from a lack of real estate information and tools. Although many real estate brokerages provide visibility into property listing information on their web sites, these tools remain surprisingly poor. Overall, brokerages and other online real estate companies have introduced online technology that perpetuates the agent's role as an information source, rather than embracing the reality that the agent's role is shifting to that of information interpreter, with a value proposition more oriented around experience, knowledge, and wisdom.

Residential real estate agents also suffer from numerous problems at present. First among these is competition for consumers. High commissions and low barriers to entry have caused the agent ranks to grow far more quickly than transaction volume, intensifying competition. Second, agents have a very difficult time marketing themselves. Brokerages typically do not promote one agent over another and thus expect agents to market themselves individually. This is costly and inefficient. Lastly, agents suffer from a lack of collaborative tools.

To stay competitive, agents increasingly turn to third-party lead sources. Several companies have met this demand by capturing customer information online and reselling it as "leads" to interested agents. Agents encounter several problems during this process. First, the leads may be very poorly qualified. Depending on how the lead seller induces customers to provide their contact information, the "leads" may comprise people that simply are curious to know the value of their house, for example. Second, the agent must expend significant time and effort to move the leads through a sales process. Third, leads purchasing is generally costly.

Vendors, or real estate service providers, can include mortgage lenders, appraisers, inspectors, title companies, escrow companies, insurers, contractors, moving companies, and other providers whose services relate to property transactions. Because each of their services is typically demanded in a property transaction, these vendors derive considerable business from informal professional networks. At present there is no mechanism that allows consumers to evaluate the value of a given network or to perceive it as an entity that has intrinsic value. It is very difficult, for instance, for an agent to market his or her "team" of linked professionals, and to derive additional business from the strength of the team.

There is a need for a system that overcomes limitations of the current real estate system, as well as providing additional benefits.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 12 shows a region on the webpage having detailed information for a property selected from the search results of FIG. 11.

Figure 1:
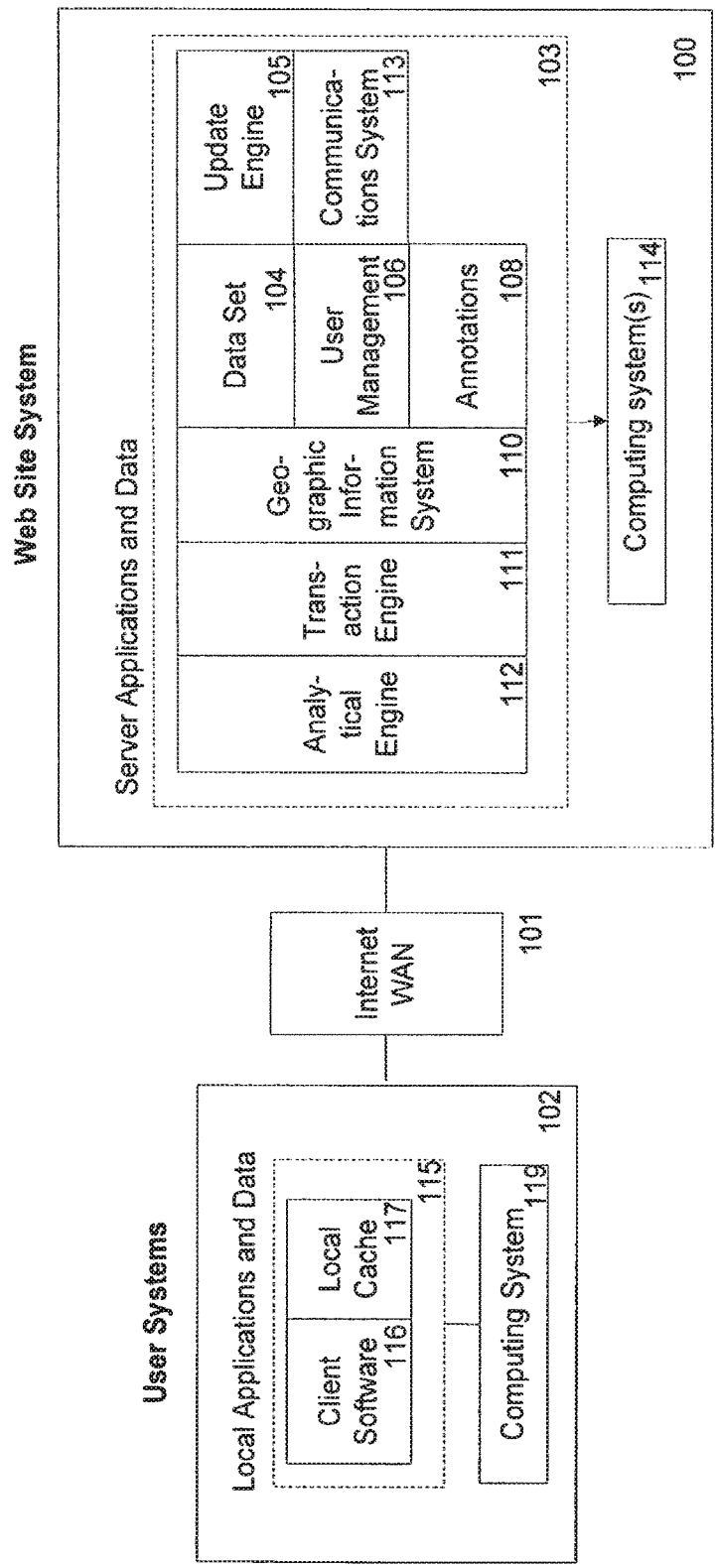
FIG. 1 shows a block diagram of a system according to one embodiment of the invention.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 110 is first introduced and discussed with respect to FIG. 1).

DETAILED DESCRIPTION

The following description provides specific details for a thorough understanding of, and enabling description for, these embodiments of the invention. However, a person of ordinary skill in the art will understand that the invention may be practiced with many variations and these details do not list every possible variation. In some instances, well known structures and functions have not been shown or described in detail to avoid unnecessarily obscuring the description of the embodiments of the invention.

In some embodiments of the invention, a web site implemented in a computer system allows users to navigate an aerial image of a geographic region and search for real estate within the region. Among its many uses described herein, embodiments of the web site system provide a forum for collaborative real estate transaction teams, for searching for real estate, for searching for real estate service providers, and for analyzing real estate data and trends. In some embodiments, the system displays information on the web page but other delivery methods can be used (such as email).

Embodiments of the invention described herein comprise an online open marketplace for real estate and related services. Embodiments of the marketplace provide improved information and tools, ways for agents and consumers to connect, and mechanisms that allows vendors to harness the power of their networks. Lastly, the marketplace provides the ability for direct property transactions among members.

Embodiments of the invention include numerous innovative informational, analytical, and collaborative tools. One such toolset is a GIS-based (Geographic Information System) real estate platform that integrates a broad array of disparate data sets related to the real estate transaction process. These data sets include property listing data from e.g., one or more multiple listing services (MLS); property data from non-MLS sources such as newspapers or other online listing repositories; aerial and satellite imagery; street maps; geographic representations of parks, schools, neighborhoods, bus lines, restaurants, shops, and other similar data elements; geographic representations of property parcels; non-geographic information pertinent to geographic data (park descriptions, school information, neighborhood census data, etc.); tax assessor data; census data; and links to related data from other sources.

The GIS tool provides a comprehensive, graphical means by which consumers, agents and others can rapidly evaluate properties for sale, view historical transactions, and evaluate a broad array of data related to property transactions. Further analytical tools allow users to query the data sources to find property data (e.g., all data on properties that have sold in a given area over a given time period, all properties meeting certain other arbitrary criteria, etc.). Additional tools provide information about broader market trends, from neighborhood and community sales to nationally aggregated data.

In addition to these tools, some embodiments of the marketplace provide users with valuable data that is aggregated from system user trends. Thus property sellers can for example see how many system users have viewed their property details, how many have indicated an interest in the property, and so on. On an individual level, this "backend" data can also be used for targeted advertising. For example, if a visitor to the marketplace is viewing a 1920's era home, the web site system might show an advertisement for a hardware store because an older home is likely to need repairs. Similarly, the web site system might show an advertisement for a furniture store that specializes in furniture from a style appropriate to the house's period, such as Arts & Crafts, or Art Deco.

Some embodiments of the marketplace further provide a mechanism whereby users may pay to promote services or products to other users within the marketplace. For example, an agent may pay an advertising fee to elevate the visibility of that agent within the result set of a given agent search. A property seller may pay a fee to elevate the visibility of a given property within the result set of a given property search.

Some embodiments of the marketplace also provide users with an open community that enables consumers and agents to share their experiences, exchange information, and harness the shared knowledge of the community members.

In some embodiments, the marketplace includes mechanisms for collaboration between various users of the system. Shared access to select user account information and a messaging system allow consumers to share their. "favorites" folder with their agents, and for the agent to place properties in the consumers "suggested" folder and to append comments that will be visible to the consumer. Additional messaging tools allow agents, consumers and other parties to communicate about transaction-related events and to centrally log account activity so that the parties are informed of critical events quickly and efficiently. Additionally, consumers can provide family and friends with access to their account so that family members can suggest or comment on properties during the purchase process.

Some embodiments of the invention provide an open marketplace framework for connecting real estate agents and consumers. The marketplace provides an innovative mechanism for consumers to select, contact, and negotiate with real estate agents.

One embodiment of the marketplace provides a "gallery" of member agents. Consumers may query this gallery to view agents and sort by categories such as experience, consumer ratings, areas served, specialization, number of transactions completed, languages spoken, and terms of business. Consumers may query the list directly or may set up a profile and use the system's matching technology to automatically select a suitable subset of agents.

Another embodiment of the marketplace provides for several mechanisms by which consumers can solicit business from agents. Consumers may contact agents directly through a messaging interface that preserves consumer anonymity. Consumers may also publish a profile into the network that describes themselves, the properties or types of properties they wish to buy or sell, the services they are seeking, the terms under which they would like to conduct business, and any other information that may be relevant to a real estate professional. Consumers may then allow themselves to be contacted by any agents matching their profile. Finally, consumers may publish a message into the network indicating their desire to be contacted by any agent that can accommodate a particular request such as conducting a tour of a given home at a particular time.

A further embodiment of the marketplace offers several ways for consumers to negotiate the price of real estate services. This negotiation may be implicit in the agent selection process, if for instance the consumer only searches for agents matching a particular compensation profile. Alternatively, consumers may wish to solicit competitive bids from a number of agents in a manner similar to that used for other home contractors. Finally, the consumer may wish to create an auction-style bidding process, in which agents compete to win the consumer's business. This auction could take several forms: the consumer could invite the agents to participate; they could allow any agents matching their profile to participate; or they could allow any member agent to participate.

This framework for selecting, contacting, and negotiating with an agent provides consumers with good visibility into agent quality, a competitive price for agent services, and flexibility in selecting agent compensation structures. For agents, the system offers reduced sales and marketing costs, an effective way to differentiate themselves as individuals, and a source of customers.

Various embodiments facilitate networking by real estate service providers such as agents and vendors. Real estate agents and vendors (lenders, escrow, inspectors, etc.) can harness the power of their informal business networks online. Agents and vendors can publish their profiles into the network such that they can be queried, viewed, etc. Vendors can then form associations within the system to indicate their partner providers, such that consumers can assess a given provider based on the strength of the overall network in addition to other factors.

In some embodiments, the marketplace provides a mechanism whereby property transactions may occur directly between consumers. In this framework, consumers employ the informational and analytical tools of the system to view homes, assess fair market value, etc. Consumers may then contact one another directly using a similar anonymous messaging system, such that bids and other information may be exchanged directly among consumers.

Figure 2:
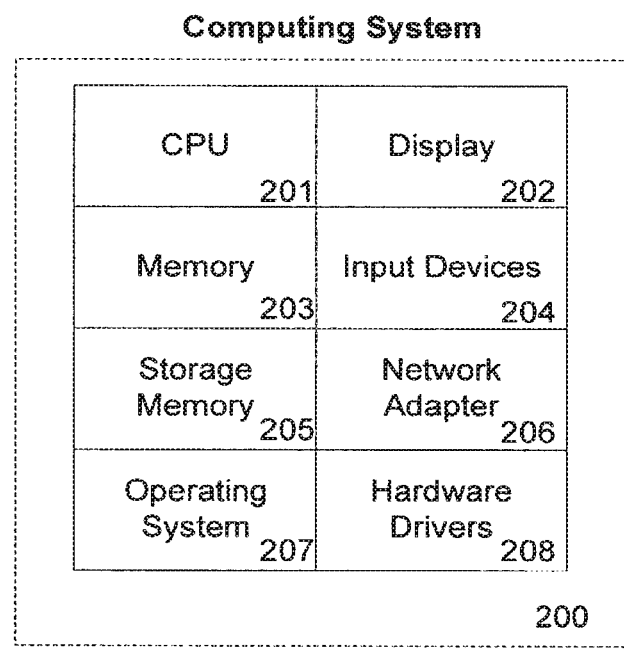
FIG. 2 shows a block diagram of an embodiment of a computer system suitable for use with the disclosed inventions.

FIG. 1 and FIG. 2 describe a Web Site System 100 that allows one or more users, each operating a User System 102, to submit, request, and view data over a wide are network (WAN) such as the Internet 101. The Internet is a combination of (public and/or private) networks that are linked by standard communication protocols such as TCP/IP and HTTP. The Web Site System and User system interact via a client-server relationship wherein a program on the. User System or Client Software 116 "client" makes a request to a Web Site System operating as a "server". The client waits for a response and then processes the response to display information. The client can be a standard web browser such as Netscape Explorer or Microsoft's Internet Explorer, including browser plug-ins such as Macromedia Flash, or specialized client software downloaded from the server.

The Web Site System 100 is composed of Server Applications and Data 103 and one or more WSS Computing Systems 114. Components of the Applications and Data 103 may be distributed across multiple Computing Systems 114.

The User System 102 is composed of Local Applications and Data 115 and a User Computing System 119. Computing systems may be a traditional desktop computer or mobile device such as portable computer, personal digital assistant (PDA), mobile phone, or the like.

The Computing Systems 114 and 119 may comprise: a Central Processing Unit "CPU" 201 for executing commands; an optional Display 202 for conveying visual information to a user; Memory 203 for temporarily holding information and instructions; optional Input Devices 204 which can include a keyboard, mouse, microphone or other apparatus for entering instructions or data; Storage Memory 205 which stores information and software applications; a Network Adapter 206 for communicating over the Internet, local area network, or other network; an Operating System 207 for coordinating between the various components and software applications; and various Hardware Drivers 208 that allow the operating system to communicate with physical elements of the Computing Systems 114 and 119.

The Data Set 104 includes information that provides functionality to users of the Web Site System 100. Various embodiments of the Data Set 104 include combinations of property addresses, historical property transactions, tax assessor records, other government data sources, listings of properties for sale including photos and multimedia, satellite photography and other raster-based data sets, parcel outlines and other vector-based data, neighborhood boundaries and names, zip codes, parks, schools, roads, businesses, and relevant geographic coordinates associated with the various data elements. The data set also includes non-geographic data that describes or relates to other geographic data elements, such as school information, neighborhood profiles, etc. In addition to these data elements, the web site system may include hyperlinks to various Internet-based sources of information. Some embodiments of the system can overlay data from the Data Set 104 as overlay layers (e.g., tax parcel boundaries, parks, schools, etc.) on a base layer (e.g., a satellite image, aerial photo, etc.).

The Data Set 104 also contains user-specific information. This includes information entered by users via User Management 106, described below; system-generated user data; and data generated by system users about other system users.

The Data Set 104 also contains information generated using the Annotations 108 functionality. Annotations 108 include text-based comments, pictures, videos, or other types of digital information that is added to the Web Site System 100 by various users. A user can add Annotations 108 into the Web Site System 100 and associate this information with various elements of the Data Set 104. Annotations 108 added to the Web Site System 100 may be public or private. Annotations may be shared between specific users or with all users of the Web Site System 100.

The Update Engine 105 adds new data elements to the existing Data Set 104 through a number of mechanisms including FTP, manual data loads, and "crawling" or "scraping" of related documents and information found on the Internet 101.

The User Management 106 system provides for the enrollment of various users, profile creation, user-specific capabilities, and the management of various user profiles. User Management 106 provides different capabilities for various users of the system including: consumers who may be interested in buying or selling real estate; real estate agents; associated professionals including appraisers, mortgage lenders, escrow providers, title insurance providers, property management providers; associates of users, such as consumer friends and family members; and other parties that may be involved in a real estate transaction. Finally, User Management 106 may use a cookie or other signifier specific to the user within the Local Cache 117 on the User System 102. User-specific data is contained within the Data Set 104 described previously.

The Analytical Engine 112 processes various elements of the Data Set 104 to provide derivative calculations, associations, comparisons, or predictions to users of the system. In addition, the Analytical Engine 112 may associate components of the Data Set 104 or User Management system 106 and store these associations in the Web Site System 100. The Analytical Engine 112 further associates elements of the Data Set 104 by an address matching mechanism. For example, new property listings received from a multiple listing service (MLS) are associated with their prior transaction records or legal description in a tax assessor database through this mechanism.

The Transaction Engine 111 facilitates negotiations, communication, electronic signing of contracts, payment transfers between users, coordination of ongoing transactions, tracking of work performed by users of the system, maintaining pricing, and other marketplace-related elements of the Web Site System 100. This may also include the management and tracking of various referral fees, advertising fees, direct payments, and transaction fees associated with doing business within the Web Site System 100. Upon completion of a transaction in the marketplace, users can provide feedback and ratings about service providers involved with the transaction. The feedback is associated with the User Profile of the party providing the services via the User Management 106 functionality.

Embodiments of the Geographic Information System (GIS) 110 generate a digital map using elements in the Data Set 104, User Management system 106, or derivative information processed by the Analytical Engine 112. Users can select which elements of the data set to display on the digital map. Further, the GIS 110 provides users with navigation capabilities for moving within the digital map by panning (moving north, east, west, and south) and increasing or decreasing the elevation to adjust the level of detail. The GIS 110 also enables users to select specific elements that are shown on the digital map and return additional information contained within the Data Set 104, Annotations 108, or User Management system 106. The GIS 110 provides for the ability to separately transfer different types of data elements over the Internet and for the storage of these elements on a User System 102 in a Local Cache 117. In this manner the GIS 110 references the User System 102 prior to requesting any information from the Web Site System 100. For example, non-dynamic raster data such as satellite photography may be cached locally on the User System 102 while dynamic text or vector components are sent separately to improve performance. Finally, elements of the Data Set 104, relationships derived through the Analytical Engine 112, and elements of the User Management system 106 can be tied to a specific geographic location on the map.

The Communications System 113 manages messaging between users, including system messages. Messaging occurs through email and internal messages that are visible to users upon signing into the Web Site System 100.

Figure 3:
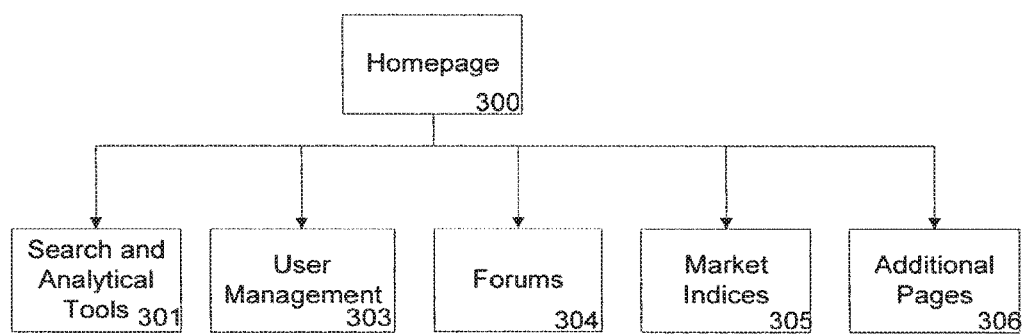
FIG. 3 shows a block diagram of a web site suitable for use with embodiments of the disclosed inventions.

FIG. 3 demonstrates how users of the Web Site System 100 start their interaction with the primary Homepage 300. The Homepage may include a randomly selected property offered for sale, other elements of the Data Set, summary data calculated from the Analytical Engine, or a real estate agent profile. The Homepage additionally includes links to other sections of the Web Site System 100 including Search and Analytical Tools 301, User Management 303, Forums 304, Market Indices 305, and various Additional Pages 306. Forums 304 encompass online discussion/chat groups that are generally started and maintained by system users, and would for example include agent discussion groups, consumer discussion groups, and other vendor groups. These may be organized around user type, geographic area, subject of interest, etc. Additional Pages 306 may include information about the company, educational content for consumers, educational content for real estate professionals, relevant news articles, and other offerings.

The Search and Analytical Tools 301 provide a single integrated framework for evaluating many aspects of a given real estate market. Users may view properties available for sale and assess these properties within the context of prior sales data derived from the tax assessors and other data sources, as well as supplemental area-specific data, market data, and aggregated system user data. Finally, system users can create Annotations 108 to this data that are then associated with their user profile. These annotations can be made public or shared with other users based on preferences configured in the User Management system 106.

Tax assessor information may include prior sales data about a property. The prior sales data from the tax assessor information can be used to determine an appropriate sales price for a property. One way to price a house is by determining an average difference between sales price and prior sales data of nearby homes that have been sold recently. By determining the average differences between tax assessor's data and actual sales price of other homes, the system can estimate a sales price. As a simple example, assume house A was recently sold for $150,000 and house B was sold for $140,000. Further, the prior sales data from the tax assessor indicates that house A last sold for $100,000 dollars and house B also sold for $100,000. Therefore the average difference between the most recent sales price and the prior sales price is $(((150,000-100,000)+(140,000-100,000))/(100,000+100,000)) \times 100\% = 45\%$. Thus, a sales price for house C can be calculated by multiplying its prior sales price by 145%. Of course, the system can use other variables such as the length of time since the last sale, school districts, similarities/differences between the properties, etc., to refine this technique. Similarly, the system can aggregate many of these sales estimations and calculations to arrive at an "index" for housing prices within a region selected by the user (typically the region shown in the aerial map). In some instances, the index can be visually presented to the user by color coding an overlay on the satellite image (e.g., red for "hot" areas where the price is increasing, blue for "cool" areas where the price is falling, etc.).

The Search and Analytical Tools 301 also provide an open framework that allows consumers, real estate agents, and associated professionals to search other user profiles, take actions based on those search results, and eventually engage in electronic commerce using capabilities contained within the Transaction Engine 11.

User Management 303 allows system users to create and manage accounts within the system, create and manage detailed profiles for publication in the Marketplace 302. Additional features (described in greater detail below) specific to the type of user further facilitate communication and collaboration.

Forums 304 functionality allows users to share experiences and insights, query other users, comment on elements of the various data sets, and improve the value of their shared knowledge. System users may post public comments regarding various elements of the data set including descriptions of various specific neighborhoods, analysis of specific properties for sale, descriptions of the real estate process, and other relevant information. Real estate agents and other associated professionals can contribute to the Forums 304 to further increase their credibility within the Web Site System 100, providing consumers with objective examples of their working knowledge.

Figure 4:
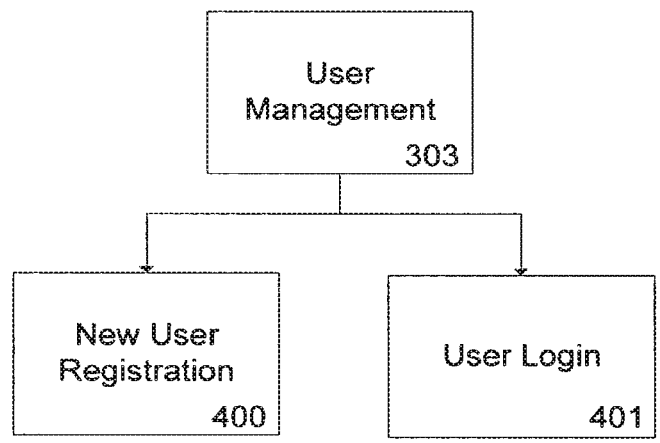
FIG. 4 shows a block diagram of user management associated with the web site of FIG. 3.

FIG. 4 describes how users of the Web Site System 100 can access the User Management 303 functions of the web site to create a new account with New User Registration 400 or sign into an existing account through the User Login 401. Although the Web Site System 100 provides different capabilities to different types of users, users may sign in using the same User Login 401 system.

New User Registration 400 is not required to access basic capabilities found within the Search and Analytical Tools 301, Marketplace 302, Forums 304, Market Indices 305 or any Additional Pages 306. The New User Registration 400 process allows the user to create a username and password, to provide a valid email account, and to select a user type corresponding to each of the user roles including consumer, agent, or associated professional. Depending on the user type and the level of system access desired, registration may have the user provide additional information such as name, address, contact information, etc. This may employ validation by the Web Site System 100 using information contained within the Data Set 104, the Transaction Engine 111, or external means such as credit card authentication. Once a user has successfully registered, a user profile is created within the User Management system 106.

Figure 5:
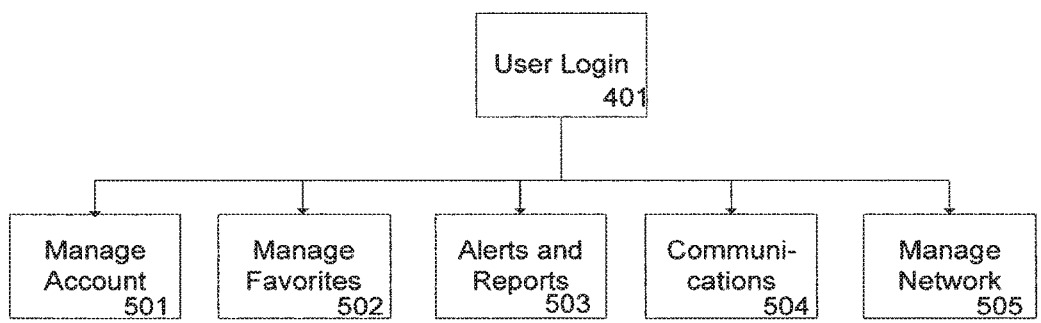
FIG. 5 shows a block diagram of an embodiment of a user login process.

FIG. 5 describes the various components associated with a User Login 401. Upon signing in, users view a system display that is customized to their user type, system access level, transaction activity, and user preferences.

Manage Account 501 enables users to view and edit information about themselves. This includes contact information, account information, and the user profile. The profile describes the user, his or her objectives, and any other information that may be relevant to other users. In general, the profile will include different types of information for different user types. For example, consumer profiles may indicate the type of services desired, the criteria that a consumer seeks for a property, and so on. Agent profiles may include the agent's experience, areas served, languages spoken, specialties, services offered, payment terms, and so on. Manage Account 501 functionality also allows users to configure account preferences that help customize various aspects of the Web Site System 100 to their needs. For example, users may wish to publish various aspects of their profile into the Marketplace 302 for viewing by other users.

Manage Favorites 502 encompasses properties, searches, users, or other elements of the data set that users wish to save, flag, or otherwise associate with their account in order to increase the usability of the Web Site System 100. For properties, users may wish to create folders containing properties of interest, rejects, a "watch list", suggested properties from other users, etc. Users may also wish to save or flag other users, if for instance a consumer maintains a folder of potential agent vendors. Users may also wish to save searches, such as a search for properties meeting certain criteria or for consumers that seek certain services (e.g., home buyers looking for a home inspector, real estate agent with knowledge of a certain area, etc.).

Users may optionally use the Web Site System 100 to automatically run saved searches and communicate the results via email or an internal system message. Alerts and Reports 503 functionality enables users to configure the frequency and mechanism of these updates, which are then communicated to the user and displayed Communications 504. Alerts and Reports 503 may also be configured to allow users to regularly view reports pertaining to market data, changes in status for certain properties, and other changes to various aspects of system and user data.

Communications 504 allows users to see messages distributed by the Communications System 113, and to initiate or request communications with other users. This functionality can encompass communications with agents or vendors regarding active transactions.

Network Management 505 allows users to form associations with other users and to define the rules of these associations. For example, consumers may wish to allow friends or family members to view the properties that they are interested in, to annotate those properties, and/or to add properties to a folder for the consumer's consideration. Consumers may also wish to associate an agent or other vendor with their account to facilitate collaboration and communication. Agents and other vendors may also wish to associate themselves with consumers, other agents, or other vendors to facilitate various aspects of conducting business on the Web Site System 100. Network Management 503 enables users to optionally publish these associations so that they are visible to other users. For example, an agent and various other vendors may wish to form a network or "team" and provide consumer visibility into the team member associations, to highlight their collective capabilities.

Figure 6:
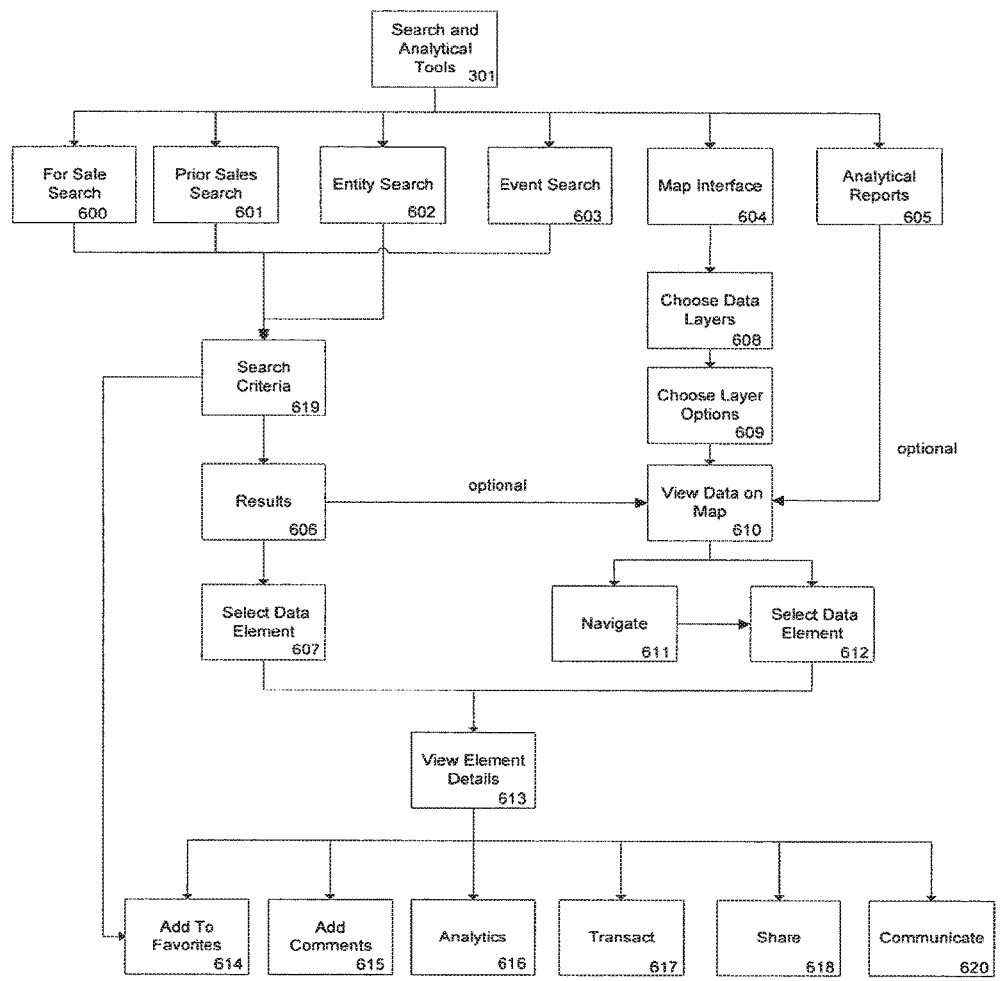
FIG. 6 shows a block diagram of search and analytical tools according to various embodiments of the invention.

FIG. 6 describes the Search and Analytical Tools 301. Users may conduct a For Sale Search 600, a Prior Sales Search 601, an Entity Search 602, or an Event Search 603. Users may additionally use the Map Interface 604 to search and explore a geographic area, and may view Analytical Reports 605 that display information relative to the real estate market. For example, an analytical report may contain an analysis of real estate trends in a particular geographic region or neighborhood.

A For Sale Search 600 allows users to view all properties within the Data Set 64 that meet certain criteria. Typical criteria would include price, size, location, quantity of various types of rooms, and other attributes commonly of interest in the home buying or selling process.

A Prior Sales Search 601 allows users to view historical sales information that meets certain criteria. Typical criteria would include location, price, date, property size, and other attributes relevant to a property sale.

An Entity Search 602 allows users to view entities that meet certain criteria. Entities could refer to any System User; to any business, such as banks, hotels, restaurants, and the like; to any individual, e.g., for the purposes of viewing public tax records; to parks, schools, bus lines, train stations, and the like; or any other data element that may pertain to an assessment of either the real estate market or a given property. According to user discretion, an Entity Search 602 may be restricted to the Data Set 104; it may encompass data from online sources accessible via the Internet; and it may encompass data local to the User Systems 102. Entity data typically includes geospatial (i.e., location) information, but may not, as in the case of anonymous system users.

The criteria used for an Entity Search 602 may vary according to entity type. Thus, a search for a real estate agent would involve criteria such as customer ratings, number of transactions, type of services provided, areas of specialization, geographic location, languages spoken, and the like. A search for schools might employ criteria such as location, size, grade levels, student/teacher ratios, standardized test score averages, etc.

An Event Search 603 allows users to view events that meet certain criteria. Events could include real estate open houses, scheduled property showings, scheduled user auctions, or other data with a temporal component. According to user discretion, an Event Search 603 may be restricted to the Data Set 104; it may encompass data from online sources accessible via the Internet, for instance to display bus schedules or movie show times; and it may encompass data local to the User Systems 102, e.g., scheduled appointments.

Search Results 606 matching the Search Criteria 619 are returned to the User System 102 for display. Users may optionally select to view the Results 606 either as text, a combination of text and graphics, or in graphical form on a map displayed to the user via the Map Interface 604. Results 606 need not be restricted to the Results of user-generated queries; for example, if a user configured a search to run automatically, this result set could also appear in Results 606.

The Map Interface 604 provides a graphical, map-based framework for viewing, exploring, and analyzing a broad array of data relevant to the real estate market and transaction process. Users of the Map Interface 604 can select between alternate "base map" layers: e.g., raster-based aerial imagery (such as satellite photos or photos taken from airplanes), or street maps (either raster- or vector-based). Users often select one "base map" layer but may choose to overlay, e.g., a street map layer onto a satellite imagery layer.

Users may modify the map in various ways to meet their individual needs. In particular, users may toggle the presence of various Data Layers 608. Valid layers include, but are not limited to, any data type that is a search Result 606 and that possesses geospatial information. Examples of data layers include properties for sale, parks, schools, outlines of property tax parcels, neighborhoods, school districts, congressional districts, census areas, bus lines, trains, retail establishments, real estate agent offices, hospitals, zoning maps, and the like.

Valid data layers may also include data from the Analytical Engine 612. Examples include neighborhood appreciation trends, area-based market activity, and the like.

Users may then View Data on the Map 610. Data sets may be displayed through a variety of means. Data that can be linked to a specific property (e.g., property data or entity data containing an address, such as a real estate office or hospital) may be represented with either a graphical icon in the correct location or by graphically outlining or illustrating the land parcel corresponding to the given property. Temporal data such as historical property sales may be displayed in this manner, or using an animated interface that updates the map according to a visible progression through time. For example, home sales trends can be visually communicated by overlaying a three color layer on the base map, where "blue" is overlaid on areas where home sales are slow (i.e., cool), yellow is overlaid on areas where home sales are average, and red is overlaid on areas where home sales are "hot". By use of the overlay, the user can quickly see which areas or properties have historically been most desirable to other home buyers.

Users may then Navigate 611 in the Map Interface. Navigation includes pan/zoom functionality, so that the user can select the area and resolution (i.e., viewing area) of interest. The resolution of the map interface corresponds to an elevation above the map. A low elevation is associated with high resolution (i.e., zooming in), which shows a smaller geographic area. A high elevation is associated with a low resolution (i.e., zooming out) and shows a larger geographic area. In other words, the elevation associated with a particular map view is high (e.g., as if in an airplane) if the map shows a large area and lower (e.g., as if in a tall building) if the map shows a small area.

Users may also Select Data Elements 612. In general, any data layer may be user-selectable. Upon selection of a data element, the Search and Analytical Tool 301 then displays the Element Details 613.

The Element Details consist of additional data relevant to a user-selected data element. In general, the Element Details function is similar for Results selected from the map and Results selected from a text- or text-and-graphics-based display. Data presented in Element Details may be restricted to the Data Set 104; it may encompass data from online sources accessible via the Internet, as well as links to that data; and it may encompass data local to the User Systems 102. Examples of Element Details include information about properties for sale, such as the house price, photographs, description of the property, the number of various types of rooms, etc.; school information; park information; real estate agent details, etc.

Upon viewing Element Details, users may take several actions. First, they may choose to add the data element to their Favorites 614, if for example the data element is a property that they wish to flag in a folder (examples include "interested", "reject", etc). Favorites could also apply to real estate agents, consumers, schools, and any other data elements. Second, users may wish to Add Comments 615 to a data element, and to determine which other users may view these comments. Third, users may wish to perform additional Analytics 616 on the given data element. This may result in an additional search (e.g., "find nearest 10 historical sales within the last 3 months") or may simply represent additional analysis (e.g., "evaluate whether this property is over- or under-valued relative to other available properties"). Fourth, users may Transact 617 against the given data element. They may wish to schedule a visit to a property; to contact an agent to request additional information or a bid for services; etc. Fifth, users may wish to Share 618 the data element with other users or other non-member entities; this is typically achieved by embedding a link to the data element details or search results inside an email. Sixth, for agent or other entity data elements, users may wish to Communicate 620 with the individual or organization involved, generally via email. Lastly, users may choose to ignore the data element, and resume searching via any steps in FIG. 6.

Search and Analytical Tools 301 also provides the ability to save user searches. After entering any Search Criteria 619, users may save these criteria using Favorites 614, may then configure the Web Site System 100 to automatically run these searches as described previously.

Figure 7:
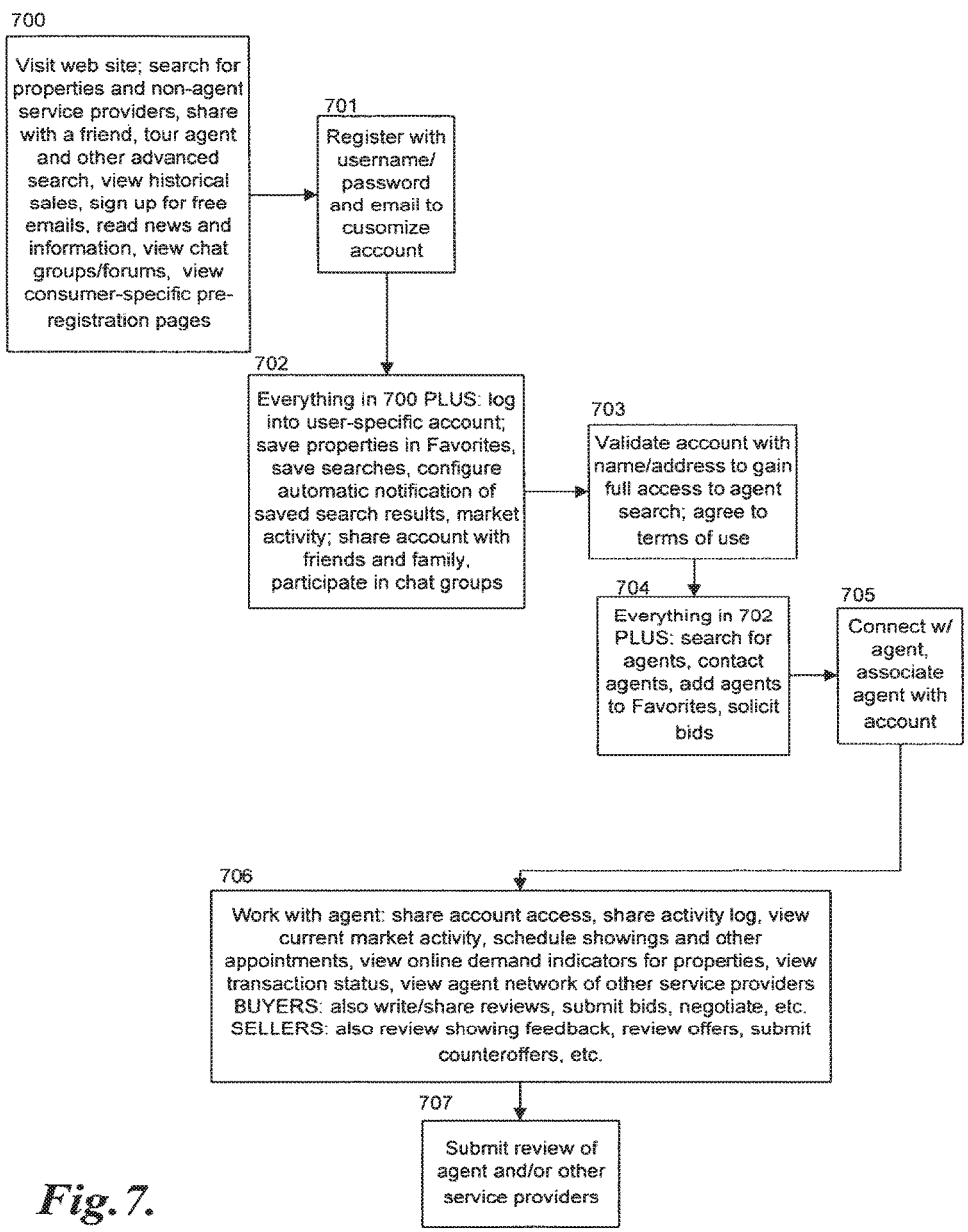
FIG. 7 shows a block diagram of an embodiment of a consumer process flow.

FIG. 7 illustrates an example consumer progression through and usage of the Web Site System 100. Consumers visiting the web site 700 may: search for and view available properties; view historical sales; search for non-agent vendors such as lenders; email property listings to friends; sign up to receive emails describing market activity, market news, or other relevant information; view chat groups and forums, as well as other informational content; and tour the advanced capabilities of the Web Site System, such as agent search, collaborative tools, etc.

Consumers may register 701 by providing an email address and creating a username and password. Registration provides access to advanced system features 702 and enables consumers to customize their experience on the Web Site System 100. In particular, registration may allow consumers to: save properties to user folders ("interested", "reject", "watch", etc); save searches, and configure automatic email notifications for search results and market activity updates; share aspects of their Favorites (user folders and/or searches) with friends, family members, and colleagues; and participate in chat groups. Registered consumers may be presented with a web page or other User System 102 display that is tailored to the consumer display preferences, etc.

Registered consumers may wish to search for a real estate agent to assist with a transaction. In some embodiments of the system, consumers must validate their identity 703 by providing full contact information (name, address, phone, etc). As part of validation, consumers may also agree to pay a referral fee to the operator of the Web Site System 100 if the consumer employs a real estate agent using the Web. Site System 100. Alternatively, the real estate agent may agree to pay a referral fee to the operator of the Web Site System 100 for new clients obtained through the Web Site System 100.

In the embodiment shown, validated consumers 704 can find and select an agent in two ways. First, the consumer can conduct an Entity Search 602 to look for a suitable real estate agent. Consumers may use the Favorites 502 functionality to maintain folders of agents 614; may create comments describing a given agent 615; may employ system analytical tools 616 to help evaluate a given agent; may share information about a given agent or agents with other users 618; and lastly, may use Transaction 617 functionality to contact an agent, to solicit bids from an agent, etc.

The second way of finding and selecting an agent is to solicit contact from real estate agents. In some embodiments, this solicitation can be done by modifying the consumer's user profile to show that the consumer desires to be contacted by a real estate agent. Validated consumers 704 may also wish to allow agents to contact them. If so, the consumers can modify their user profile to allow any agent meeting certain criteria to contact them during a specified time period; alternatively, consumers may want to schedule a visit to a property and can request that available agents contact them to arrange a showing, etc. If the consumer wants to ensure that only agents with experience in a certain geographic area answer the solicitation, the system can filter the responses. One way of filtering is to compare the transaction history of the real estate agent to the geographic area before allowing the agent to contact the consumer.

Validated consumers 704 have several options for negotiating the price of real estate services. This negotiation may be implicit in the agent selection process, if for instance the consumer only searches for agents matching a particular compensation profile. Alternatively, consumers may solicit competitive bids from a number of agents in a manner similar to that used for other home contractors. Finally, consumers may create an auction-style bidding process, in which agents compete to win the consumer's business. The auction participants can be chosen in several ways, such as: the consumer can invite preferred agents to participate; the consumer can allow any agents matching a desired profile to participate; or the consumer can allow any member agent to participate.

Once a validated consumer has selected an agent to work with 705, that agent is associated with the consumer's account. The consumer and agent may then use various system tools 706 to facilitate collaboration throughout the transaction process. First, they may share account access, so that the agent can place listing information in a "suggested" folder for the consumer to review, and can view and comment on properties in the consumer's "Favorites" folder. Second, they may share an activity log that allows both to record and view transaction activity and status. Third, they may jointly view and discuss demand indicators for specific properties; buyers may also wish to write and share reviews with their agent, while sellers may wish to review showing feedback (i.e., comments from buyers and agents who have toured the seller's property), etc. Fourth, the consumer may wish to view and interact with the agent's network of other vendors for various related products and services. Lastly, they may communicate via system messaging capabilities about scheduling for property showing, other appointments, bids/offers/counteroffers, and any other matter related to the transaction, the market, etc.

Following the conclusion of a transaction (or following the cessation of the relationship between consumer and agent), the consumer may submit a review 707 of the agent for the benefit of other system users.

Figure 8:
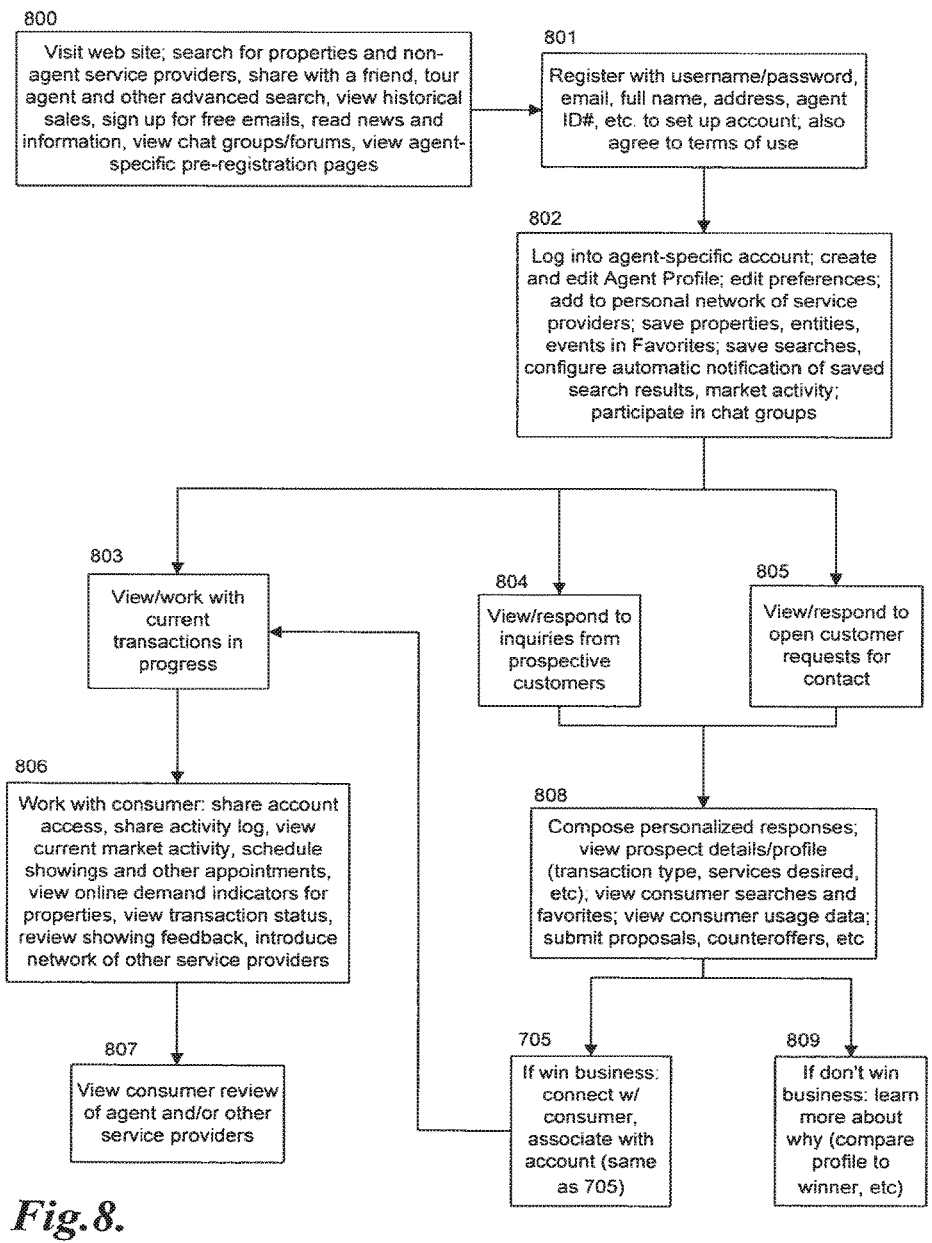
FIG. 8 shows a block diagram of an embodiment of a real estate agent process flow.

FIG. 8 illustrates an example progression of agent usage of the Web Site System 100 according to one embodiment. Agents visiting the web site 800 may: search for and view available properties; view historical sales; search for non-agent vendors such as lenders; email property listings to friends; sign up to receive emails describing market activity, market news, or other relevant information; view chat groups and forums, as well as other informational content; and tour the advanced capabilities of the Web Site System, such as agent search, agent signup, collaborative tools, etc.

In the embodiment shown, agents may register 801 by providing an email address, creating a username and password, and providing full contact information (name, address, phone, etc.) as well as a valid real estate agent identification number (e.g., real estate license number).

Agent registration can provide access to advanced system features 802 and enable agents to customize their experience on the Web Site System. In particular, registration can allow agents to 802: create and edit an agent profile that consumers can query against; edit system preferences; create and add to an online network of other users, including vendors; save properties to user folders, save searches, and configure automatic email notifications for search results and market activity updates; and participate in chat groups.

Registered agents may be presented with a web page that is tailored to the agent display preferences, etc. The primary agent sign-in display 802 typically includes a summary of activity in ongoing customer transactions 803, activity related to prospective customers 804, and system messages 805 indicating that a customer has requested contact from agents that match the given agent's profile.

The summary of ongoing customer transactions 803 typically displays a list of the agent's active customers, what transaction types they are engaged in (buying, selling, or both), and any updated activity since the agent's last logon. The agent may then drill down into further detail on any customer 806 and may use several collaborative tools.

Through shared account access, the agent may access the customer's Favorites 502 information to view, comment, on, and add to the list of properties that the customer has marked as relevant to their purchase or sale transaction. The agent can for example put new property listings into a "suggested" folder for the customer to consider, or can comment on properties in customer folders. The agent can also annotate property listings in a customer "watch list," to help buyers and sellers track market activity in their area.

Additional collaborative tools include: a shared activity log that allows agents to record various activities and tasks related to the transaction, as well as to record events such as offers, counteroffers, etc; a scheduling interface that allows the agent to work with consumers online to schedule showings and other appointments; a showings tool that allows agents to collect showing feedback from other agents and to display this to property sellers; and the ability for agents to share and promote their personal network of vendors and vendors to their customers.

Upon completion of a transaction, the agent may view 807 the customer review of the agent completed in 707.

The prospective customer summary 804 allows the agent to see a summary of inquiries and other communications from prospective customers. The agent may also see summary information regarding system messages 805 indicating that a customer has requested contact from agents that match the given agent's profile. In both cases the agent may use system tools 808 to help promote themselves to prospective customers. The agent can compose personalized responses to prospective customer inquiries; view detailed system information about prospective customers including site usage, customer Favorites information, the customer profile, etc; and submit proposals/bids and conduct negotiations with prospective customers online.

If the agent secures a new customer, they may associate the consumer with their account 705 and will then work with the consumer using the process and tools described in 803, 806, and 807. If the agent does not secure a new customer, they may review certain aspects of their profile in comparison to other agent profiles to help assess how to market themselves to consumers.

Figure 9:
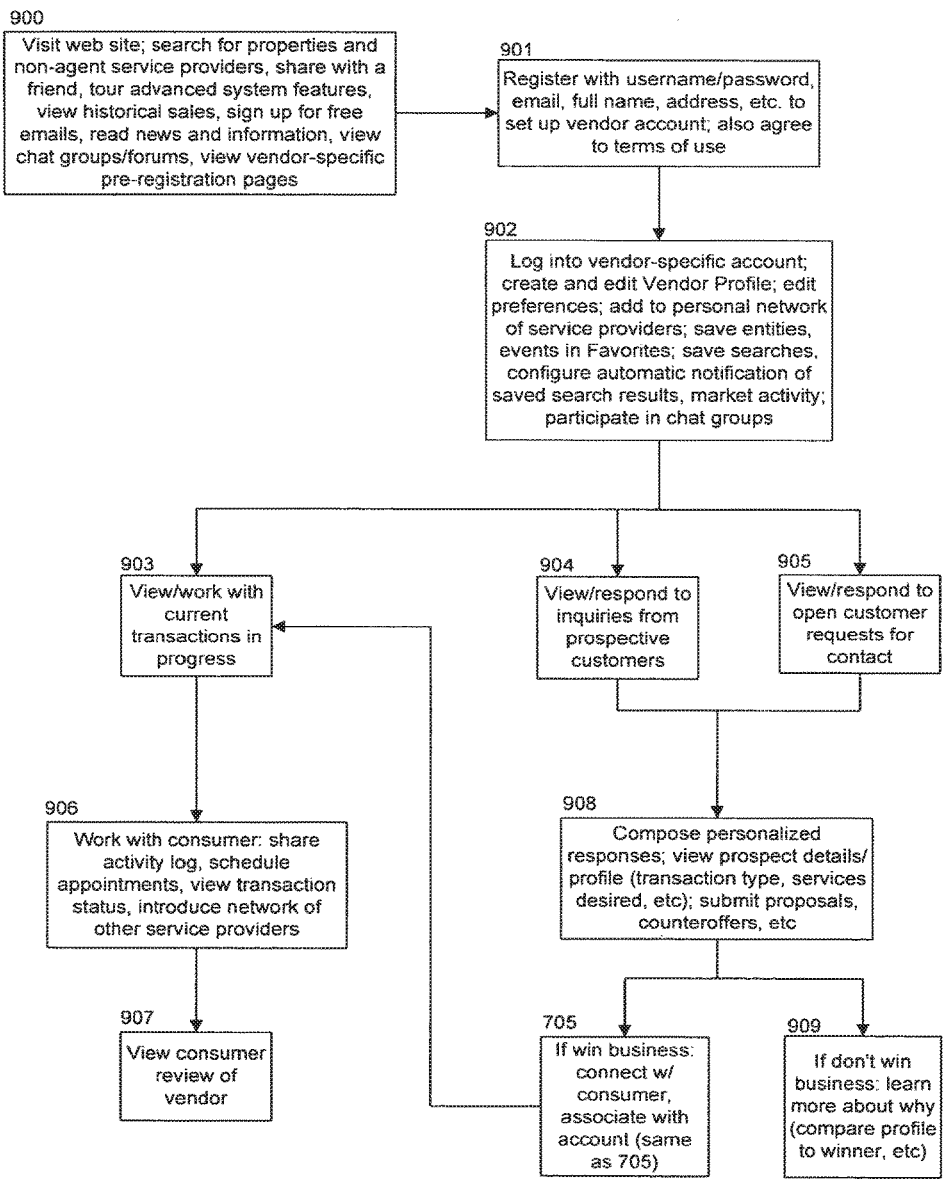
FIG. 9 shows a block diagram of an embodiment of a non-agent vendor process flow.

FIG. 9 illustrates an example progression of vendor usage of the Web Site System 100 under one embodiment. Vendors visiting the web site 900 may: search for and view available properties; view historical sales; search for non-agent vendors such as lenders; email property listings to friends; sign up to receive emails describing market activity, market news, or other relevant information; view chat groups and forums, as well as other informational content; and tour the advanced capabilities of the Web Site System, such as agent search, agent signup, collaborative tools, etc.

Vendors can register 901 by providing an email address, creating a username and password, and providing full contact information (name, address, phone, etc.) as well as indicating the type of products and/or services they offer.

Vendor registration provides access to advanced system features 902 and enables vendors to customize their experience on the Web Site System 100. In particular, registration allows vendors to 902: create and edit a vendor profile that consumers can query against; edit system preferences; create and add to an online network of other users, including agents and other vendors; save entities, events, and searches using Favorites; configure automatic email notifications for search results and market activity updates; and participate in chat groups.

Registered vendors may be presented with a web page that is tailored to the vendor display preferences. A typical vendor sign-in (i.e., home web page) display 902 includes a summary of activity in ongoing customer transactions 903, activity related to prospective customers 904, and system messages 905 indicating that a customer has requested contact from vendors that match the given vendor's profile.

The summary of ongoing customer transactions 904 typically displays a list of the vendor's active customers, what transaction types they are engaged in, and any updated activity since the vendor's last logon. The vendor may then drill down into further detail on any customer 906 and may use several collaborative tools.

Additional collaborative tools include: a shared activity log that allows vendors to record various activities and tasks related to the transaction, as well as to record events such as mortgage approval; a scheduling interface that allows the vendor to work with consumers online to schedule meetings and appointments; and the ability for vendors to share and promote their personal network of agents and other vendors to their customers.

Upon completion of a transaction, the vendor may view 907 the customer review of the vendor completed in 707.

The prospective customer summary 904 allows the vendor to see a summary of inquiries and other communications from prospective customers. The vendor may also see summary information regarding system messages 905 indicating that a customer has requested contact from vendors that match the given vendor's profile. In both cases the vendor may use system tools 908 to help promote themselves to prospective customers. The vendor can compose personalized responses to prospective customer inquiries; view detailed system information about prospective customers including site usage, customer profile, etc; and submit proposals/bids and conduct negotiations with prospective customers online.

If the vendor secures a new customer, they may associate the consumer with their account 705 and will then work with the consumer using the process and tools described in 903, 906, and 907. If the vendor does not secure a new customer, they may review certain aspects of their profile in comparison to other vendor profiles to help assess how to market themselves to consumers.

Figure 10:
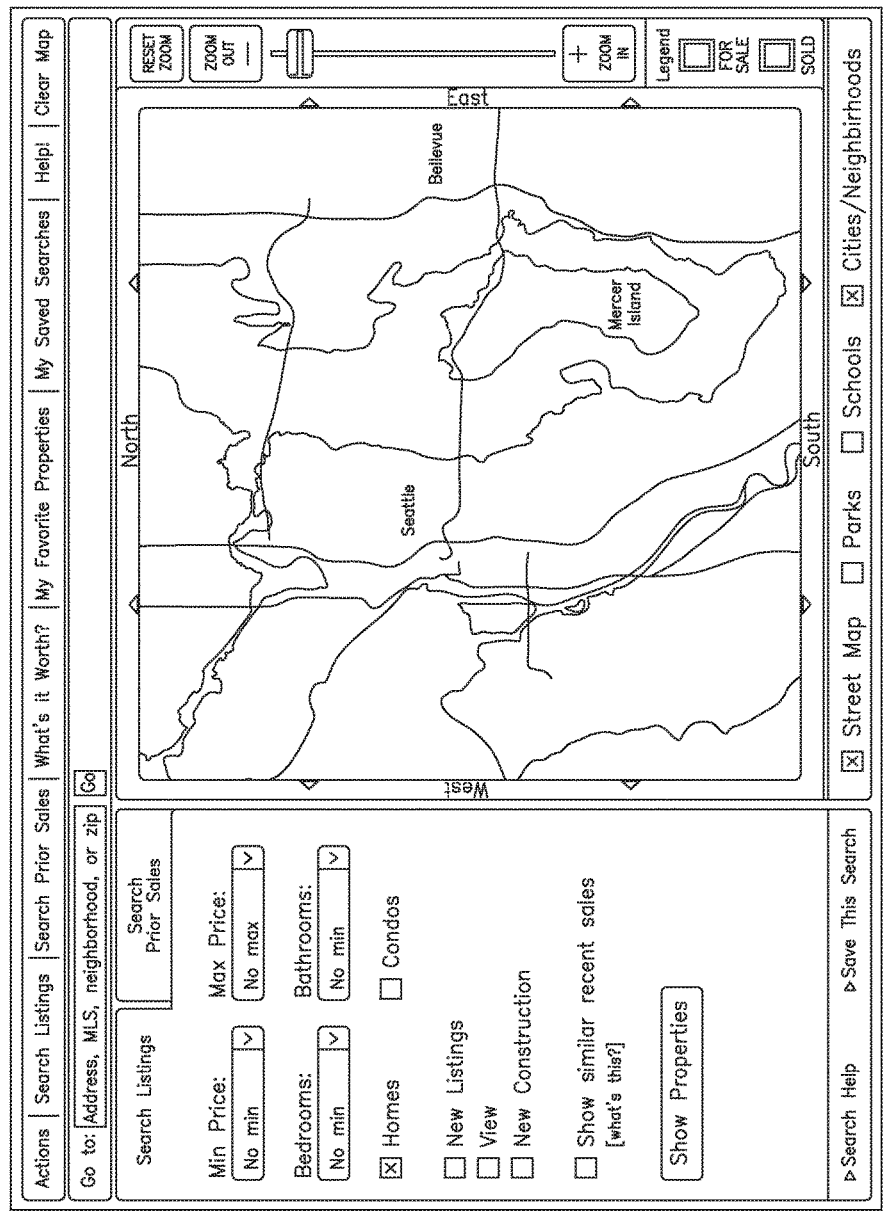
FIG. 10 shows a web page having a high-elevation view of an image of a geographic area.

FIGS. 10 through 15 illustrate an embodiment of the search/GIS tools. FIG. 10 shows a high-level view of a geographic area, assembled from satellite images. System toolbars indicate the ability to define property search criteria, as well as to toggle the presence of various relevant data layers.

Figure 11:
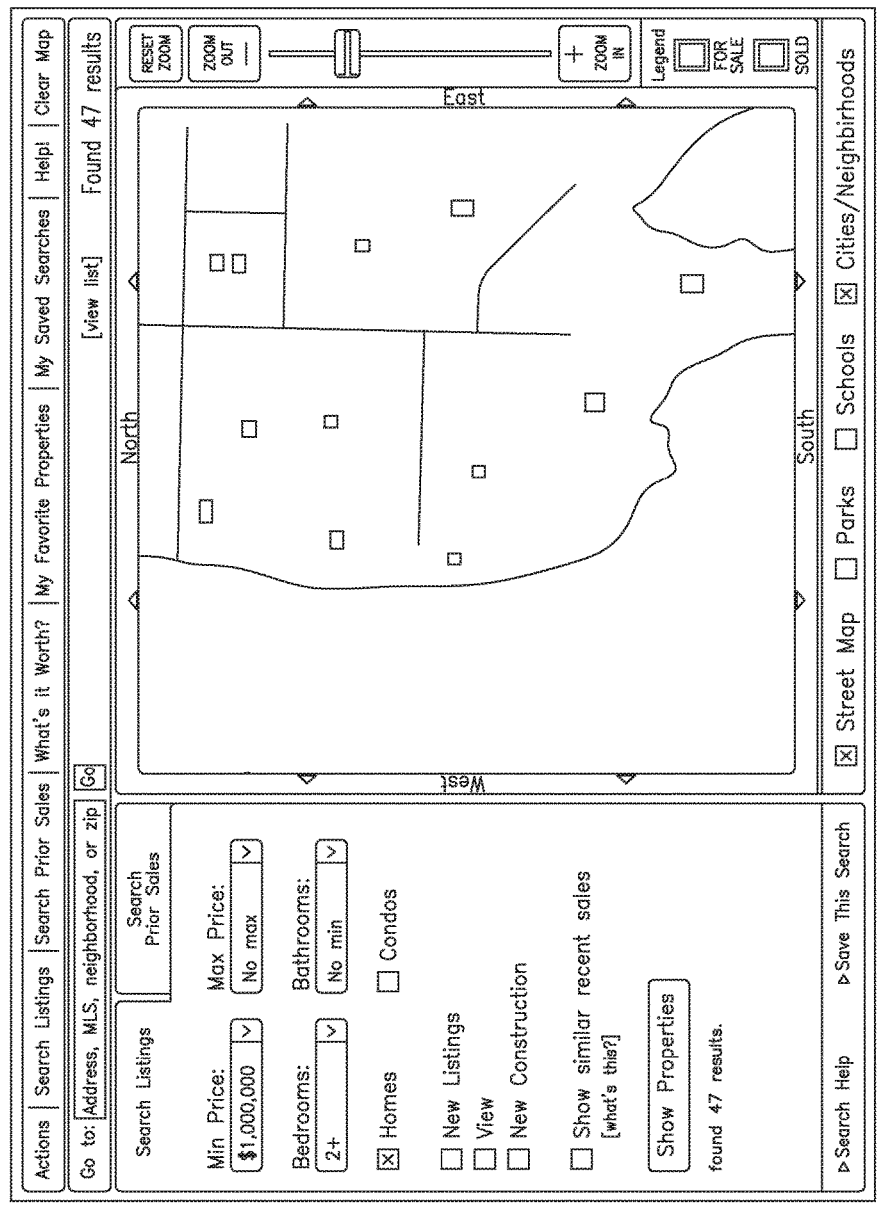
FIG. 11 shows a search result overlay on the image of FIG. 10.
Figure 12:
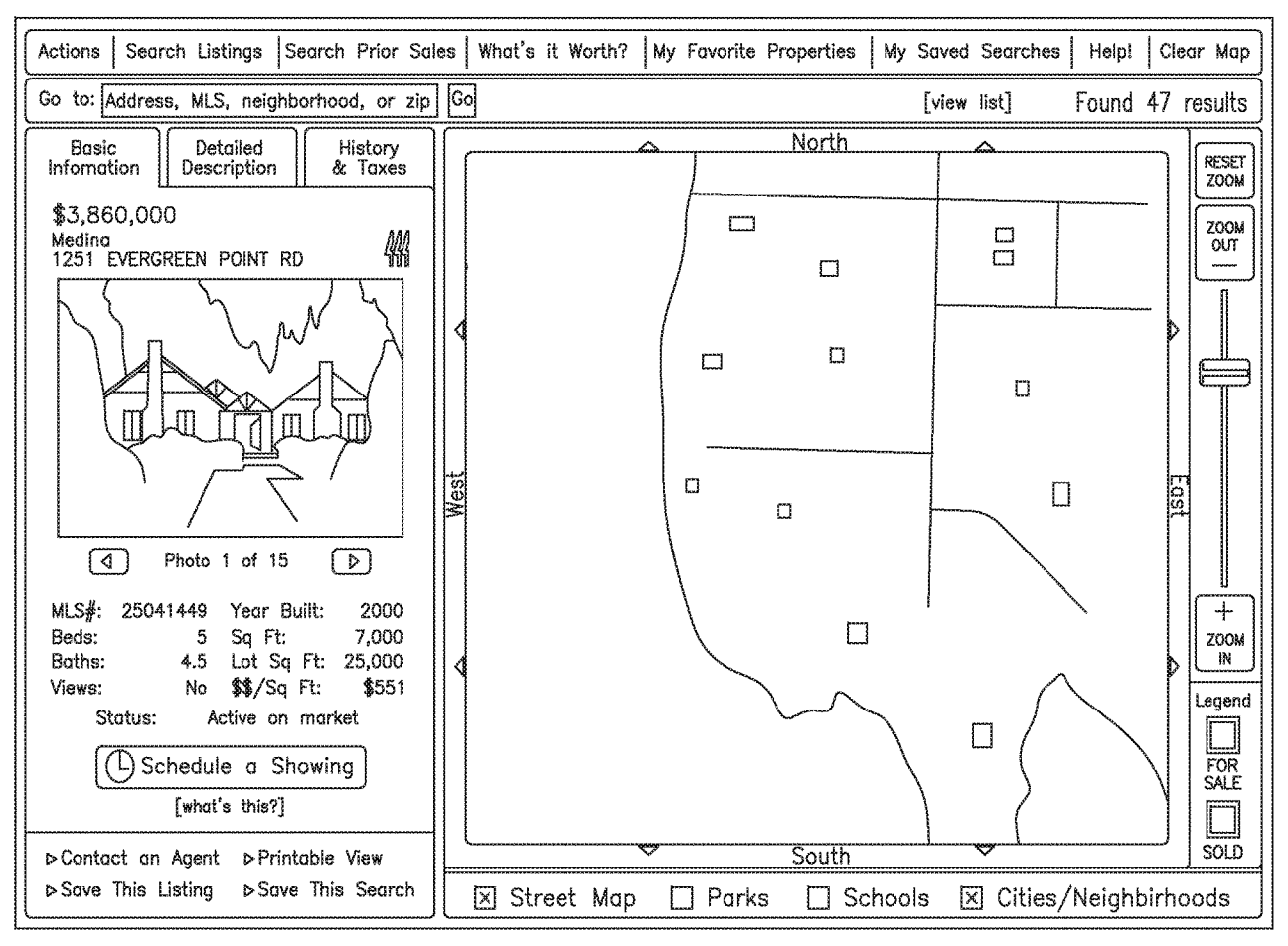

FIG. 11 illustrates a display of a given search result set. The system outlines parcels of available properties on the map. Users may then click on a given parcel, at which point the system displays the detailed listing information for the given property, as illustrated in FIG. 12.

Figure 13:
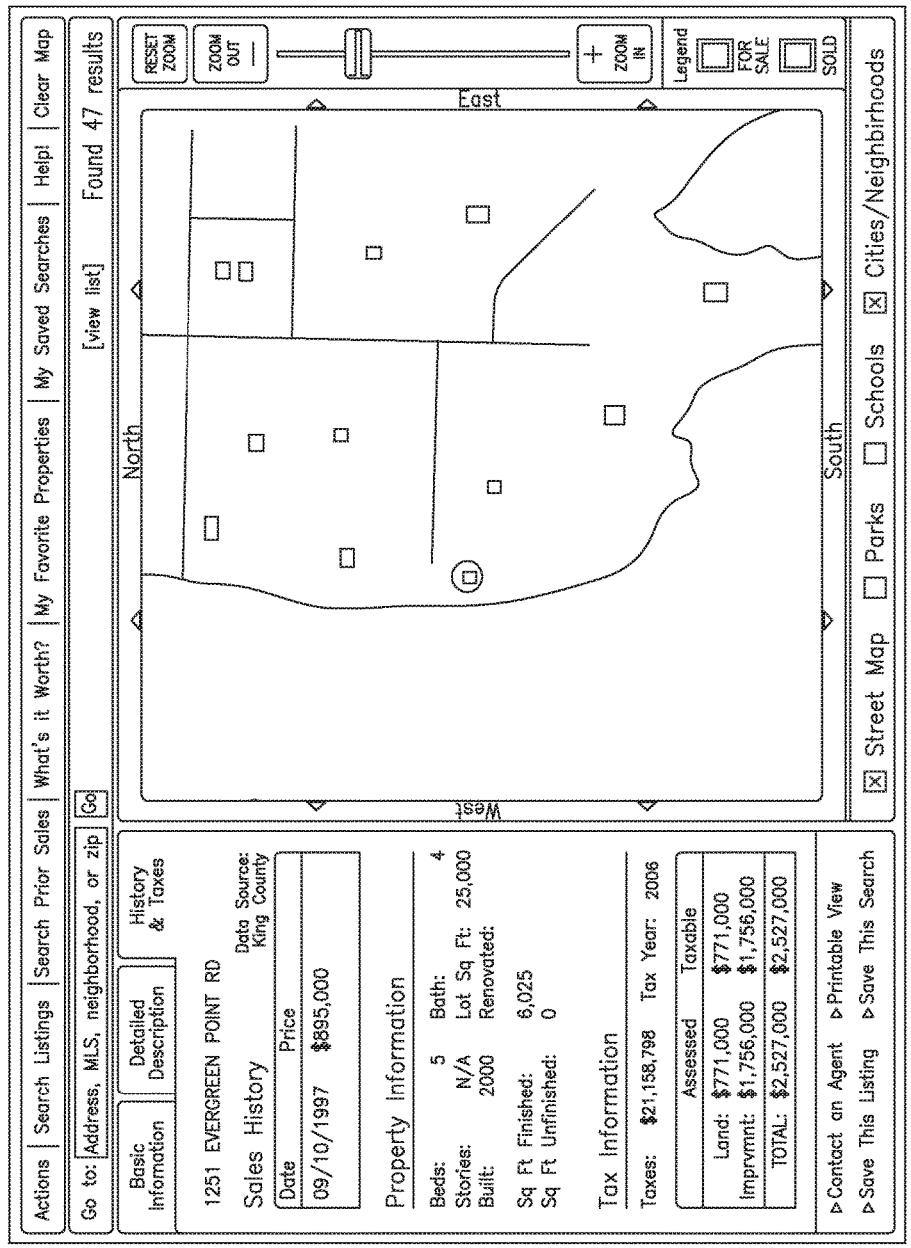
FIG. 13 shows a representative sales history for the selected property.

Users may wish to view tax and historical transaction information for a given property; the system provides this capability, as depicted in FIG. 13. The display can include current tax assessor information as well as historical sales records.

Figure 14:
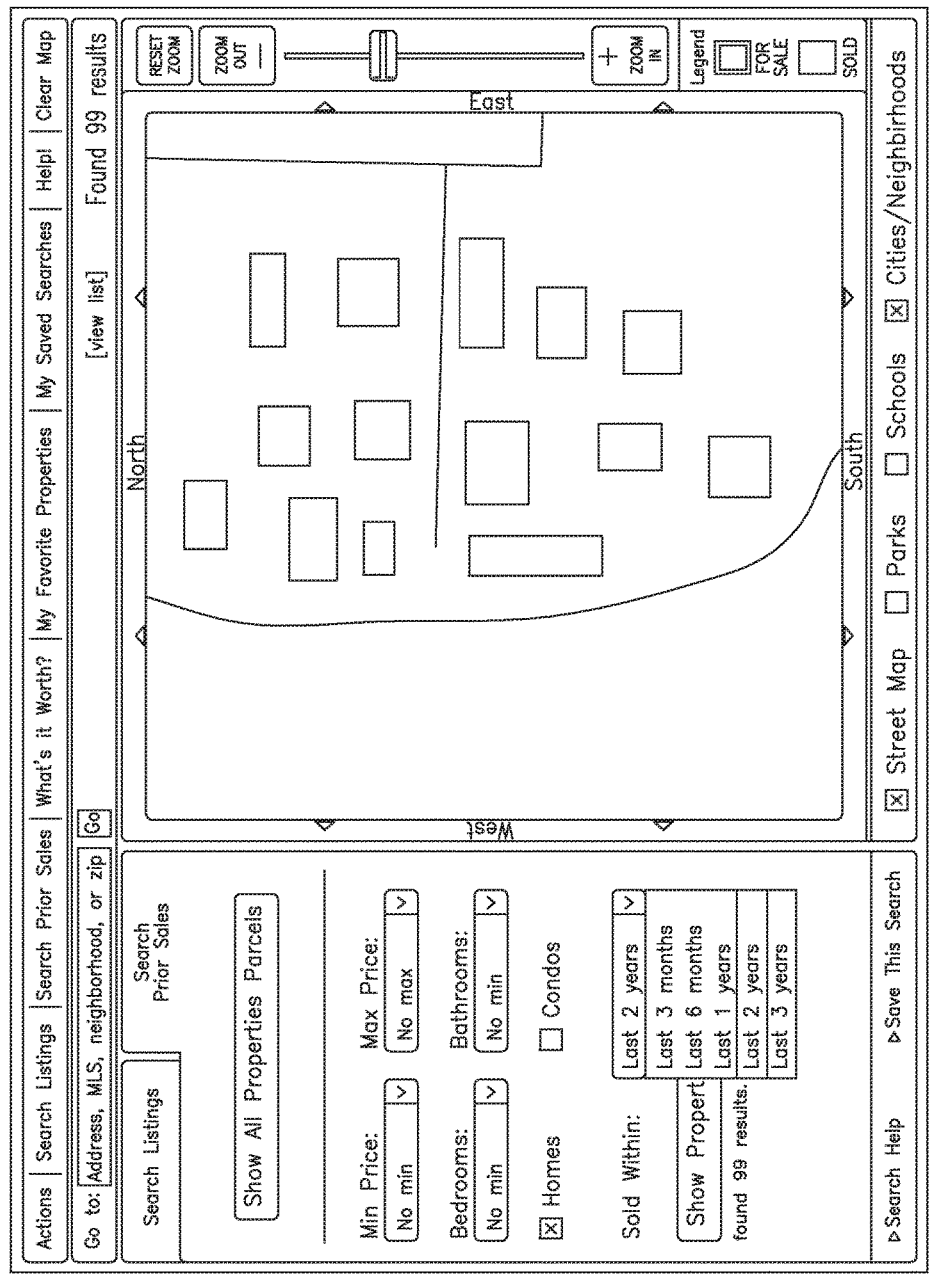
FIG. 14 shows an overlay on the image of FIG. 10 of historical sales near the selected property.

Users may also wish to view historical sales records for properties proximal to the property in question. FIG. 14 illustrates this capability. The user selects the number of properties to return and the time period of interest, and the system outlines the resulting parcels on the map using a different color. Users may then click on any one of these parcels to view tax assessed values and historical sales data.

Figure 15:
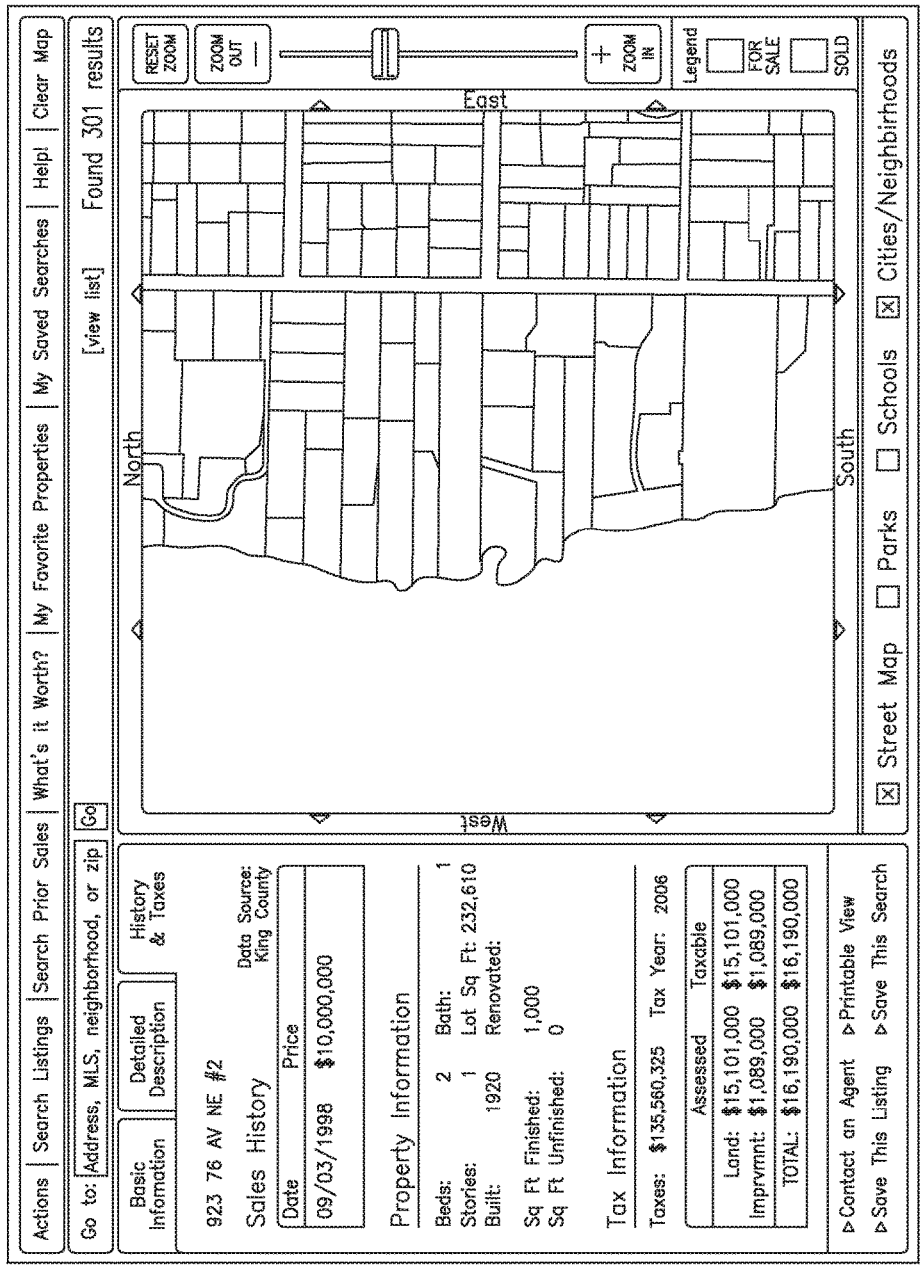
FIG. 15 illustrates an overlay that superimposes all tax parcels on the image of FIG. 10.

Lastly, users may wish to view tax assessed values and historical sales data for any arbitrary property. This is illustrated in FIG. 15. The user selects the "all parcels" data layer, at which point every property parcel is outlined and becomes user-selectable.

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may also reside in a fixed element of a communication network such as a server or database, while corresponding portions may reside on a mobile communication device, such as a laptop computer, Personal Digital Assistant ("PDA"), or mobile phone. Data structures and transmission of data particular to aspects of the invention are also encompassed within the scope of the invention.

In accordance with the practices of persons skilled in the art of computer programming, embodiments of the invention are described with reference to acts and operations that are performed by computer systems. Such computer-executed acts and operations may be performed by an operating system or an application program. The acts and operations include the manipulation by the CPU of electrical signals representing data bits and the maintenance of data bits at memory locations to operate the computer systems and process signals. The memory locations where data bits are maintained are physical locations that have particular electrical, magnetic, or optical properties corresponding to the data bits.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the embodiments described herein. These and other changes can be made to the invention in light of the detailed description.

These and other changes can be made to the invention in light of the above detailed description. In general, the terms used in the following claims should not be construed to be limited to the specific embodiments disclosed in the specification, unless the above detailed description explicitly defines such terms. Accordingly, the actual scope of the invention encompasses the disclosed embodiments and all equivalent ways of practicing or implementing the invention under the claims.

In view of the many possible embodiments to which the principles of this invention may be applied, it should be recognized that the detailed embodiments are illustrative only and should not be taken as limiting the scope of the invention. Thus, we claim as our invention all such embodiments as may come within the scope and spirit of the following claims and equivalents thereto.

What is claimed is:

1. A system comprising:
    one or more data stores including information identifying:
        a plurality of land parcels offered for acquisition within a geographic area; and
        a plurality of user accounts associated with non-real-estate agent end-users of the system, the plurality of user accounts including at least a first user account associated with a first computing device and a second user account associated with a second computing device; and
    one or more processors in communication with the data store, the one or more processors configured to at least:
        generate a first content item for display on the first computing device, the first content item corresponding to a first user interface through which a first user associated with the first user account can:
            select a land parcel, from the plurality of land parcels, to designate an association between the land parcel and the first user account, and
            select, from the plurality of user accounts, multiple other user accounts as authorized to: i) view the association of the land parcel and the first user account, and ii) designate an association between an additional land parcel of the plurality of land parcels and the first user account;
        receive, via the first user interface, a selection of the land parcel to designate the association between the land parcel and the first user account;
        generate, within the one or more data stores, the association of the land parcel with the first user account;
        receive, via the first user interface, selection of the second user account as authorized to: i) view the association of the land parcel and the first user account, and ii) designate the association between the additional land parcel as associated with the first user account;
        generate a second content item for display on the second computing device, the second content item corresponding to a second user interface that:
            indicates to a second user associated with the second user account, the association of the land parcel and the first user account, and
            enables selection of the additional land parcel to designate the association between the additional land parcel and the first user account;
        receive, via the second user interface, the selection of the at least one additional land parcel to designate the association between the additional land parcel and the first user account;
        generate, within the one or more data stores, the association between the first user account and the additional land parcel;
        receive, via the first user interface, an authorization to permit a third user account, from the plurality of user accounts, i) to view the association of the land parcel and the first user account and ii) to designate an association between a third land parcel and the first user account;
        transmit a third content item to a third computing associated with the third user account, the third content item corresponding to a third user interface that:
            indicates the association of the land parcel and the first user account, and
            enables selection of the third land parcel to designate the association between the third land parcel and the first user account;
        receive, via the third user interface, a selection of the third land parcel to designate the association of the third land parcel and the first user account; and
        generate, within the one or more data stores, the association of first user account and the third land parcel.

2. The system of claim 1, wherein at least one land parcel of the plurality of land parcels is a real estate property.

3. The system of claim 1, wherein the first user interface further enables the first user to transmit a message to an agent, and wherein the second user account is distinct from an account of the agent.

4. The system of claim 1, wherein the one or more data stores further include information identifying one or more agent accounts distinct from the plurality of user accounts.

5. The system of claim 4, wherein the first and second user accounts are associated with an individual agent account of the one or more agent accounts.

6. The system of claim 1, wherein the first user interface further enables the first user to provide a comment associated with the land parcel, and wherein the second user interface displays the comment.

7. The system of claim 1, wherein the second user interface further enables a second user associated with the second computing device to provide a comment associated with the land parcel, and wherein the first user interface displays the comment to the first user.

8. Non-transitory computer-readable media comprising computer-executable instructions that, when executed by a computing system, cause the computing system to:
    generate a first content item for display on a first user computing device associated with a first user, the first content item corresponding to a first user interface that enables a first user to:
        select a land parcel, from a plurality of land parcels for which information is maintained on the computing system, to designate an association of the land parcel and a first user account of the first user, and select, from a plurality of user accounts associated with non-real-estate agent end-users of the computing system, multiple other user accounts as authorized i) to view the association of the land parcel and the first user account and ii) to designate an association between an additional land parcel of the plurality of land parcels and the first user account;

receive, via the first user interface, a selection of the land parcel to designate the association of the land parcel and the first user account;

receive, via the first user interface, selection a second user account, of the plurality of user accounts, as authorized i) to view the association of the land parcel and the first user account and ii) to designate an association between the additional land parcel and the first user account;

generate, within one or more data stores of the computing system, the association of the first user account and the land parcel;

generate a second content item for display on a second user computing device associated with a second user, the second content item corresponding to a second user interface that:
   indicates the association of the land parcel and the first user account, and
   enables selection of the additional land parcel to designate the association between the additional land parcel and the first user account;

receive, via the second user interface, the selection of the at least one additional land parcel to designate the association of the additional land parcel and the first user account;

generate, within the one or more data stores, the association of the first user account with the additional land parcel;

receive, via the first user interface, selection of a third user account, from the plurality of user accounts, as authorized i) to view the association of the land parcel and the first user account and ii) to designate an association between a third land parcel and the first user account;

transmit, to a third computing associated with the third user account, a third content item corresponding to a third user interface that indicates the association of the land parcel and the first user account and that enables selection of the third land parcel to designate the association of the third land parcel and the first user account;

receive, via the third user interface, the selection of the third land parcel to designate the association of the third land parcel and the first user account; and generate, within the one or more data stores, the association of the first user account and the third land parcel.

9. The non-transitory computer-readable media of claim 8, wherein the first user interface further enables the first user to transmit a message to an agent, and wherein the second user account is distinct from an account of the agent.

10. The non-transitory computer-readable media of claim 8, wherein the second user interface further enables selection of one or more other user accounts, from the plurality of user accounts on the computing system, as authorized i) to view the association of the land parcel and the first user account and ii) to designate an association between additional land parcels and the first user account, and wherein the computer-executable instructions further cause the computing system to:

receive, via the second user interface, selection of a fourth user account, of the plurality of user accounts, as authorized i) to view the association of the land parcel and the first user account and ii) to designate an association between additional land parcels and the first user account; and store within the one or more data stores an authorization of the fourth user account i) to view the association of the land parcel and the first user account and ii) to designate an association between additional land parcels and the first user account.

11. The non-transitory computer-readable media of claim 10, wherein the computer-executable instructions further cause the computing system to:

transmit, to a computing device associated with the fourth user account, a fourth content item corresponding to a fourth user interface that enables selection of a fourth land parcel to designate an association of the fourth land parcel with the first user account;

receive, via the fourth user interface, the selection of the fourth land parcel; and generate, within the one or more data stores, the association of the first user account and the fourth land parcel.

12. The non-transitory computer-readable media of claim 8, wherein the first user interface includes a map of a geographic area include the plurality of land parcels.

13. The non-transitory computer-readable media of claim 12, wherein the selection of the land parcel is received in response to selection of the land parcel as displayed on the map.

14. The non-transitory computer-readable media of claim 8, wherein the first user interface further enables the first user to provide a comment associated with the land parcel, and wherein the second user interface displays the comment.

15. A computer-implemented method comprising:

generating a first content item corresponding to a first user interface that enables a first user to:
   select a land parcel, from a plurality of land parcels, to designate an association between the land parcel and a first user account of the first user, and
   select, from a plurality of user accounts associated with non-real-estate agent end-users, multiple other user accounts as authorized i) to view the association of the land parcel and the first user account and ii) to designate an association between an additional land parcel of the plurality of land parcels and the first user account;

receiving, via the first user interface, a selection of the land parcel to designate an association of the first user account with the land parcel;

receiving, via the first user interface, selection of a second user account, of the plurality of user accounts, as authorized i) to view the association of the land parcel and the first user account and ii) to designate the association between the additional land parcel and the first user account;

generating, within one or more data stores, the association of the first user account and the land parcel;

generating a second content item for display on a second computing associated with the second user account, the second content item corresponding to a second user interface that:
   indicates the association of the land parcel and the first user account, and
   enables selection of the additional land parcel to designate the association between the additional land parcel and the first user account;

receiving, via the second user interface, the selection of the at least one additional land parcel;

generating, within the one or more data stores, the association of the first user account and the additional land parcel;

receiving, via the first user interface, selection of a third user account, from the plurality of user accounts, as authorized i) to view the association of the land parcel and the first user account and ii) to designate an association between a third land parcel and the first user account;

transmitting, to a third computing associated with the third user account, a third content item corresponding to a third user interface that indicates the association of the land parcel and the first user account and that enables selection of the third land parcel to designate the association of the third land parcel and the first user account;

receiving, via the third user interface, the selection of the third land parcel to designate the association of the third land parcel and the first user account; and generating, within the one or more data stores, the association of the first user account and the third land parcel.

16. The computer-implemented method of claim 15, wherein the first user interface further enables the first user to transmit a message to an agent, and wherein the second user account is distinct from an account of the agent.

17. The computer-implemented method of claim 15, wherein the first user interface further enables the first user to provide a comment associated with the land parcel, and wherein the second user interface displays the comment.

18. The computer-implemented method of claim 15, wherein the second user interface further enables selection of one or more other user accounts, from the plurality of user accounts on the computing system, as authorized i) to view the association of the land parcel and the first user account and ii) to designate an association of additional land parcels and the first user account, and wherein the computer-implemented method further comprises:

receiving, via the second user interface, selection of a fourth user account, of the plurality of user accounts, as authorized i) to view the association of the land parcel and the first user account and ii) to designate an association of additional land parcels and the first user account; and storing within the one or more data stores an authorization to the fourth user account i) to view the association of the land parcel and the first user account and ii) to designate an association of additional land parcels and the first user account.

* * * * *